(12) United States Patent
Nahum

(10) Patent No.: US 12,536,691 B2
(45) Date of Patent: Jan. 27, 2026

(54) MACHINE VISION SYSTEM UTILIZING MEASUREMENT MARKING DEVICE

(71) Applicant: Mitutoyo Corporation, Kanagawa-ken (JP)

(72) Inventor: Michael Nahum, Seattle, WA (US)

(73) Assignee: MITUTOYO CORPORATION, Kanagawa-Ken (JP)

(*) Notice: Subject to any disclaimer, the term of this patent is extended or adjusted under 35 U.S.C. 154(b) by 56 days.

(21) Appl. No.: 18/067,240

(22) Filed: Dec. 16, 2022

(65) Prior Publication Data

US 2024/0202963 A1  Jun. 20, 2024

(51) Int. Cl.
*G06T 7/73* (2017.01)
*G06T 7/60* (2017.01)

(52) U.S. Cl.
CPC ............... *G06T 7/73* (2017.01); *G06T 7/60* (2013.01); *G06T 2207/10148* (2013.01); *G06T 2207/30164* (2013.01); *G06T 2207/30204* (2013.01)

(58) Field of Classification Search
CPC ......... G06T 7/0004; G06T 7/73; G06T 7/571; G06T 2207/10056; G06T 2207/30164; B25J 9/1697; B25J 15/0019; G01B 11/24; H04N 5/2256; H04N 5/23212
See application file for complete search history.

(56) References Cited

U.S. PATENT DOCUMENTS

| | | | |
|---|---|---|---|
| 6,542,180 B1 | 4/2003 | Wasserman et al. | |
| 6,996,291 B2 | 2/2006 | Nahum | |
| 7,003,161 B2 | 2/2006 | Tessadro | |
| 7,030,351 B2 | 4/2006 | Wasserman et al. | |
| 7,085,431 B2 | 8/2006 | Jones et al. | |
| 7,127,159 B2 | 10/2006 | Gladnick et al. | |
| 7,324,682 B2 | 1/2008 | Wasserman | |
| 7,454,053 B2 | 11/2008 | Bryll et al. | |

(Continued)

FOREIGN PATENT DOCUMENTS

| | | |
|---|---|---|
| EP | 1475627 A2 | 11/2004 |
| EP | 1533996 B1 | 12/2006 |

OTHER PUBLICATIONS

Mitutoyo Corporation & Micro Encoder Inc., "QVPAK—3D CNC Vision Measuring Machine—User's Guide," Manual No. 99MCB225A, Version 7, Series No. 359, Jan. 2003. (326 pages).

*Primary Examiner* — Md N Haque
(74) *Attorney, Agent, or Firm* — Seed Intellectual Property Law Group LLP

(57) ABSTRACT

A machine vision inspection system and method perform operations including: acquire a first image at a first image position, wherein the first image includes a first feature of a workpiece and a first measurement marking set of a measurement marking device (MMD); determine a first relative position of the first feature in the first image; move a stage supporting the workpiece to acquire a second image at a second image position, wherein the second image includes a second feature of the workpiece and a second measurement marking set of the MMD; determine a second relative position of the second feature in the second image; and determine a distance between the first feature and the second feature based at least in part on the first relative position, the second relative position and a distance between a measurement marking of the first set and a measurement marking of the second set.

22 Claims, 18 Drawing Sheets

(56) References Cited

U.S. PATENT DOCUMENTS

| | | |
|---|---|---|
| 7,499,584 B2 | 3/2009 | Delaney |
| 7,522,763 B2 | 4/2009 | Tessadro |
| 7,567,713 B2 | 7/2009 | Ding |
| 7,570,795 B2 | 8/2009 | Yu et al. |
| 7,627,162 B2 | 12/2009 | Blanford et al. |
| 7,885,480 B2 | 2/2011 | Bryll et al. |
| 8,111,905 B2 | 2/2012 | Campbell |
| 8,111,938 B2 | 2/2012 | Bryll et al. |
| 8,605,291 B2 | 12/2013 | Tobiason |
| 8,692,880 B2 | 4/2014 | Tobiason |
| 9,013,574 B2 | 4/2015 | Saylor et al. |
| 9,080,855 B2 | 7/2015 | Nahum et al. |
| 9,143,674 B2 | 9/2015 | Gladnick |
| 9,830,694 B2 | 11/2017 | Bryll |
| 10,880,468 B1 | 12/2020 | Bryll |
| 11,002,529 B2 | 5/2021 | Nahum |
| 11,249,225 B2 | 2/2022 | Gladnick |
| 2004/0223053 A1 | 11/2004 | Gladnick et al. |
| 2008/0100829 A1* | 5/2008 | Watson ............... G01B 11/0608 356/123 |
| 2012/0092488 A1* | 4/2012 | Delaney ............. G01B 11/0608 348/128 |
| 2012/0243790 A1* | 9/2012 | Campbell .......... G01N 21/8806 382/199 |
| 2013/0076892 A1* | 3/2013 | Nahum ................ G01B 11/002 348/135 |
| 2013/0120553 A1* | 5/2013 | Delaney ............... G02B 21/365 348/86 |
| 2014/0293077 A1* | 10/2014 | Delaney ................. G02B 21/24 348/211.6 |
| 2015/0015696 A1* | 1/2015 | Delaney ............... H04N 23/631 348/86 |
| 2022/0138976 A1 | 5/2022 | Campbell et al. |
| 2023/0003510 A1* | 1/2023 | Morii ..................... G01B 11/12 |

* cited by examiner

MACHINE VISION SYSTEM UTILIZING MEASUREMENT MARKING DEVICE

BACKGROUND

Technical Field

This disclosure relates to precision metrology and, more particularly, to a machine vision system utilizing a measurement marking device for precision measurements.

Description of the Related Art

Precision non-contact metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC-based vision systems and QVPAK® software available from Mitutoyo America Corporation (MAC), located in Aurora, Illinois. The features and operation of the QUICK VISION® series of vision systems and the QVPAK® software are generally described, for example, in the QVPAK 3D CNC Vision Measuring Machine User's Guide, published January 2003, which is hereby incorporated by reference in its entirety. This type of system uses a microscope-type optical system and moves the stage to provide inspection images of workpieces.

Accuracies in the micron or sub-micron range are often desired in such systems. This may be challenging with regard to measurements of distances/dimensions that may exceed a single field of view. For example, measurement of a distance between features on a workpiece that are separated by a dimension greater than a field of view typically requires movement of the workpiece stage and at least partial reliance on position encoders for sensing the amount of movement of the workpiece stage. The level of precision and reliability achieved for such measurements is often less than that achieved for measurements of distances between workpiece features within a single field of view (i.e., that can be captured in a single image). Techniques that may improve or otherwise enhance the accuracy, precision and/or reliability achieved for measurements of distances greater than a single field of view would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a machine vision inspection system is provided, which includes: a stage that receives a workpiece; an imaging system that images the workpiece; a movement mechanism configured to change a stage position relative to at least part of the imaging system; an encoder-based measurement portion that provides position measurements indicative of the stage position relative to at least part of the imaging system; and a control system portion. The machine vision inspection system is configured to provide first and second operating states. The first operating state comprises utilizing the encoder-based measurement portion to determine a distance measurement. The second operating state comprises:

- utilizing the imaging system to acquire a first image at a first image position, wherein the first image includes a first feature of a workpiece and a first measurement marking set that comprises one or more measurement markings of a measurement marking device;
- determining a first relative position of the first feature of the workpiece in the first image;
- utilizing the movement mechanism to change the stage position relative to at least part of the imaging system so that the imaging system is directed toward a second image position;
- utilizing the imaging system to acquire a second image at the second image position, wherein the second image includes a second feature of the workpiece and a second measurement marking set that comprises one or more measurement markings of the measurement marking device;
- determining a second relative position of the second feature of the workpiece in the second image; and
- determining a distance measurement between the first feature of the workpiece and the second feature of the workpiece based at least in part on the first relative position, the second relative position and a distance between a measurement marking of the first measurement marking set and a measurement marking of the second measurement marking set.

According to another aspect, a method for operating a machine vision inspection system is provided. The method includes providing the first and second operating states which are utilized for determining distance measurements.

According to a further aspect, a method for operating a machine vision inspection system in an enhanced measurement operating state is provided, comprising:

- utilizing the imaging system to acquire a first image at a first image position, wherein the first image includes a first feature of a workpiece and a first measurement marking set that comprises one or more measurement markings of a measurement marking device;
- determining a first relative position of the first feature of the workpiece in the first image;
- utilizing the imaging system to acquire a second image at a second image position, wherein the second image does not overlap with the first image and the second image includes a second feature of the workpiece and a second measurement marking set that comprises one or more measurement markings of the measurement marking device;
- determining a second relative position of the second feature of the workpiece in the second image; and
- determining a distance measurement between the first feature of the workpiece and the second feature of the workpiece based at least in part on the first relative position, the second relative position and a distance between a measurement marking of the first measurement marking set and a measurement marking of the second measurement marking set.

DETAILED DESCRIPTION

Figure 1:
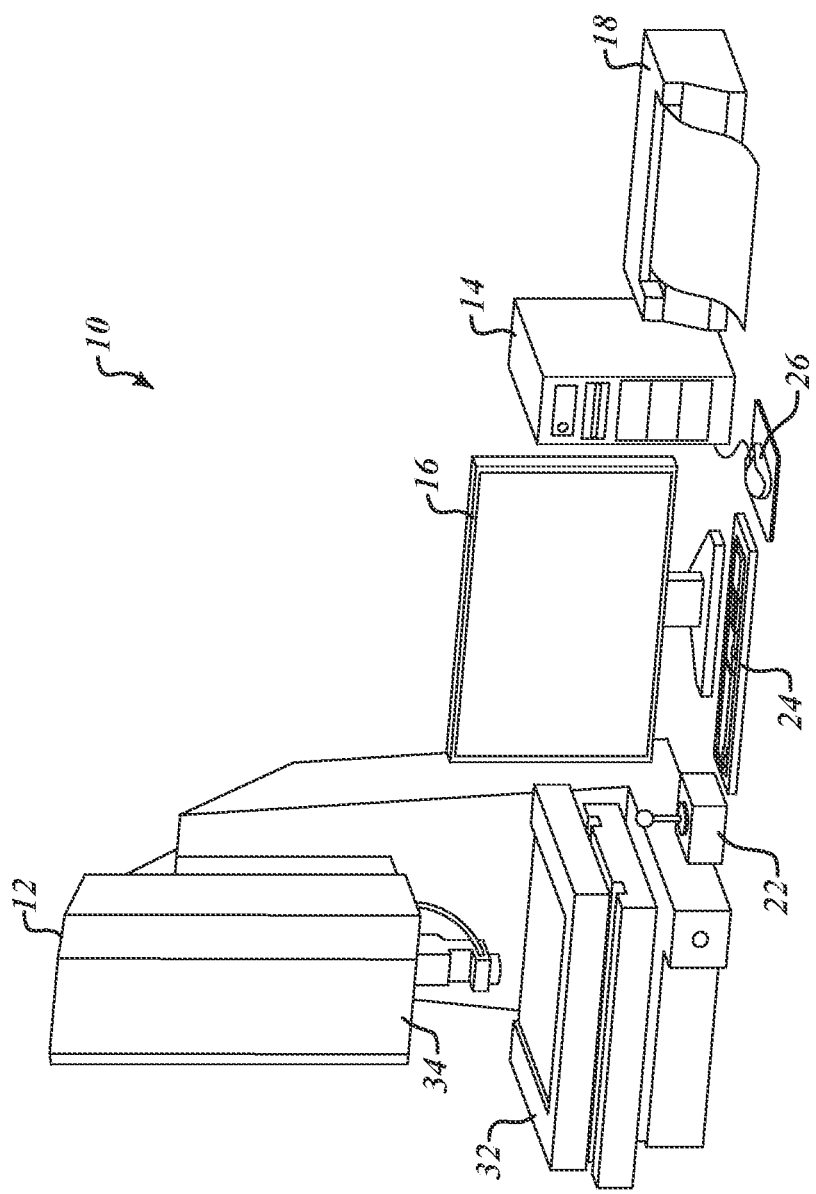
FIG. 1 is a diagram showing various typical components of a general purpose machine vision inspection system.

FIG. 1 is a block diagram of one exemplary machine vision inspection system 10. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touchscreen tablet or other computing elements or the like may be substituted for and/or redundantly provide the functions of any or all of the elements 14, 16, 22, 24 and 26.

Those skilled in the art will appreciate that the controlling computer system 14 and/or control system portion 120 (FIG. 2) may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. In various implementations, the workpiece stage 32 may be movable (e.g., in x-axis and y-axis directions) to move a workpiece, etc. that is located on the workpiece stage relative to the optical imaging system 34. The zoom lens or interchangeable objective lenses generally provide various magnifications for the images provided by the optical imaging system 34. Certain aspects of the machine vision inspection system 10 are also described in U.S. Pat. Nos. 7,454,053; 7,324,682; 8,111,905; and 8,111,938, each of which is hereby incorporated herein by reference in its entirety.

Figure 2:
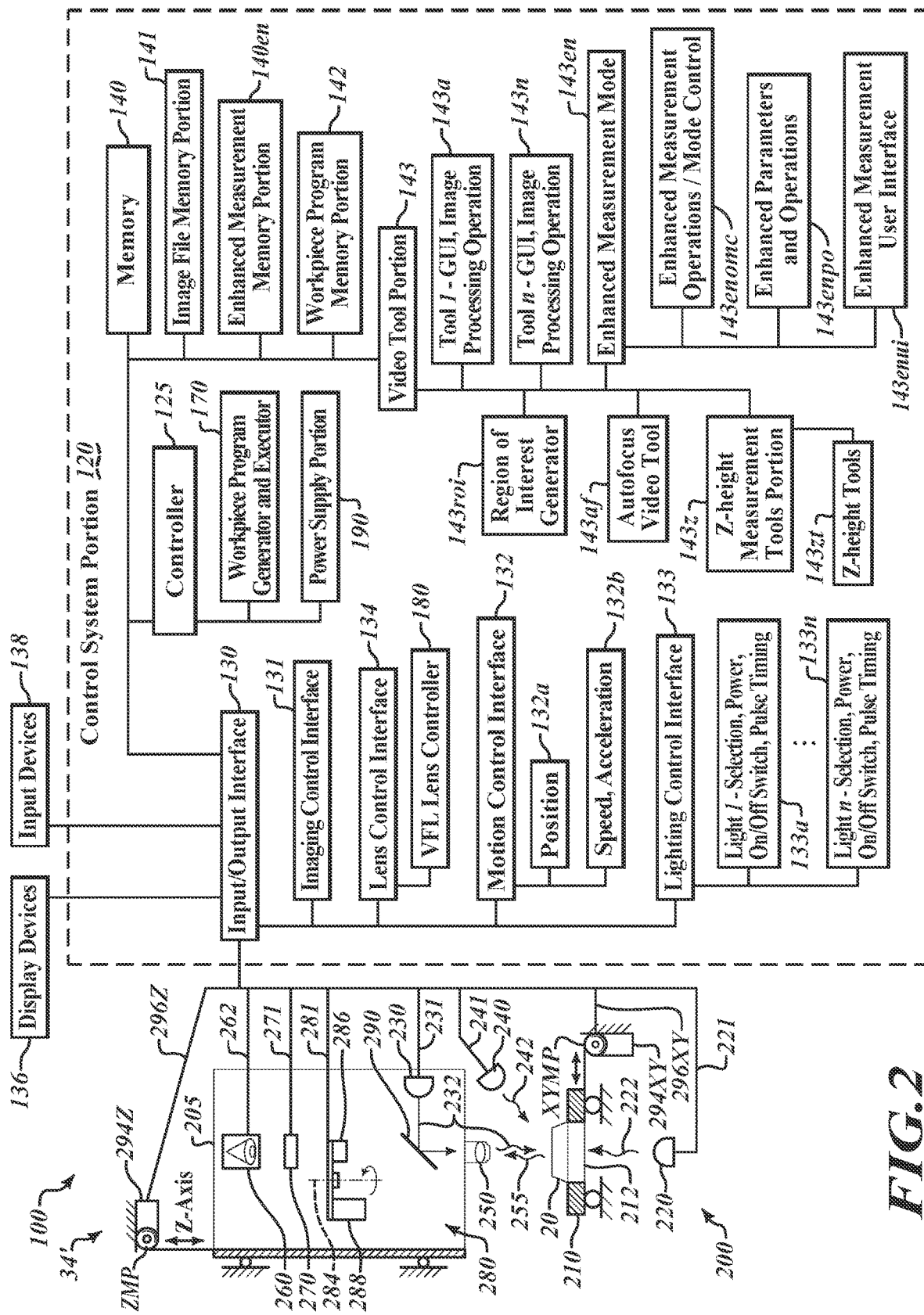
FIG. 2 is a block diagram of a control system portion and a vision components portion of a machine vision inspection system similar to that of FIG. 1, and including features according to this invention.

FIG. 2 is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The control system portion 120 may be arranged to exchange data and control signals with the vision components portion 200. The vision components portion 200 includes an optical imaging system 34' and a workpiece stage 210 (e.g., which may be similar or identical to the stage 32 of FIG. 1). In some implementations, at least part of the workpiece stage 210 may be implemented as a conveyor that one or more workpieces 20 are located on and moved by (e.g., to pass under the optical imaging system 34' for imaging). The optical imaging system 34' includes an optical assembly portion 205 and light sources 220, 230, 240.

In the example of FIG. 2, the workpiece stage 210 includes a central transparent portion 212 and is controllably movable along x- and y-axes that lie in a plane that is generally parallel to the surface of the stage where a workpiece 20 and other objects (e.g., a measurement marking device MMD, such as a ruler, etc.) may be positioned. The workpiece stage 210 is controllably movable along the x- and y-axes by a movement mechanism 294XY configured to change a stage position of the workpiece stage 210 relative to at least part of the imaging system 34'. In various implementations, the movement mechanism 294XY (e.g., a controllable motor) may drive an actuator to move the workpiece stage 210 (e.g., to move the workpiece 20 and measurement marking device MMD) relative to the optical assembly portion 205 including the objective lens 250 of the imaging system 34' (e.g., so that a field of view (FOV) of the optical assembly portion 205 of the imaging system is moved to different parts of the workpiece 20, etc. for acquiring different images at different image positions, such as for acquiring images of different features of the workpiece 20).

An encoder-based measurement portion XYMP (e.g., as included in or attached to the movement mechanism 294XY or otherwise coupled to or proximate to the workpiece stage 210) includes one or more position encoders, and provides position measurements indicative of the position of the workpiece stage 210 (e.g., relative to the optical assembly portion 205). Specifically, the encoder-based measurement portion XYMP may provide position measurements indicative of the stage position relative to at least part of the imaging portion 34'. The movement mechanism 294XY (e.g., a controllable motor) and the encoder-based measurement portion XYMP are connected to an input/output interface 130 via a signal line 296XY (e.g., which may include separate signal line portions for providing control signals to and/or for receiving signals from the movement mechanism 294XY and the encoder-based measurement portion XYMP).

The optical assembly portion 205 includes a camera system 260 and an interchangeable objective lens 250 included in an objective lens portion 245. In some implementations, the optical assembly portion 205 may optionally include a variable focal length (VFL) lens 270, e.g., a tunable acoustic gradient (TAG) lens that creates a lensing effect using sound waves in a fluid medium, such as that disclosed in U.S. Pat. Nos. 9,143,674 and 9,830,694, each of which is hereby incorporated herein by reference in its entirety.

In various implementations, the optical assembly portion 205 may further include a turret lens assembly 280 having lenses 286 and 288. As an alternative to the turret lens assembly, in various implementations a fixed or manually interchangeable magnification-altering lens, or a zoom lens configuration, or the like, may be included. In various implementations, the interchangeable objective lens 250 in the objective lens portion 245 may be selected from a set of fixed magnification objective lenses that are included as part of a variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a movement mechanism 294Z (e.g., a controllable motor) that drives an actuator to move the optical assembly portion 205 along the z-axis to change the focus of the image of the workpiece 20. An encoder-based measurement portion ZMP (e.g., as included in or attached to the movement mechanism 294Z or otherwise coupled to or proximate to the optical assembly portion 205) includes one or more position encoders, and provides position measurements indicative of the position of the optical assembly portion 205 (e.g., relative to the stage 210 on which the workpiece 20 is located). The movement mechanism 294Z and the encoder based measurement portion ZMP are connected to an input/output interface 130 via a signal line 296Z (e.g., which may include separate signal line portions for providing control signals to and/or for receiving signals from the movement mechanism 294Z and the encoder-based measurement portion ZMP). For example, the control signals may be provided through the input/output interface 130 to control the movement mechanism 294Z to move the optical assembly portion 205 to change the focus of the image (e.g., to change the focus position of the objective lens 250 relative to the workpiece 20).

In various implementations, to change the focus of the image over a smaller range, or as an alternative to moving the optical assembly portion 205, the VFL (TAG) lens 270 may be controlled via a signal line 271 by a lens control interface 134 to periodically modulate the optical power of the VFL lens 270 and thus modulate an effective focus position of the optical assembly portion 205. The lens control interface 134 may include or be connected to a VFL lens controller 180 including circuits and/or routines for controlling various image exposures synchronized with the periodic focus position modulation provided by the VFL (TAG) lens 270. In some implementations, the lens control interface 134 and the VFL lens controller 180 may be merged and/or indistinguishable.

One or more of a stage light source 220, a coaxial light source 230, and a surface light source 240 (e.g., a ring light) may emit source light 222, 232, and/or 242, respectively, to illuminate the workpiece or workpieces 20. For example, during an image exposure, the coaxial light source 230 may emit source light 232 along a path including a beam splitter 290 (e.g., a partial mirror). The source light 232 is reflected or transmitted from the workpiece 20 as image light 255, and the image light used for imaging passes through the interchangeable objective lens 250, the turret lens assembly 280, and the VFL (TAG) lens 270, and is gathered by the camera system 260.

A workpiece image exposure which includes the image of the workpiece(s) 20, is captured by the camera system 260 (e.g., including a pixel array), and is output on a signal line 262 to the control system portion 120. In addition to carrying image data, the signal line 262 may carry signals from the controller 125 for controlling the camera system 260 (e.g., for initiating image acquisition, etc.) Various light sources (e.g., the light sources 220, 230, 240) may be connected to a lighting control interface 133 of the control system portion 120 through associated signal lines (e.g., the busses 221, 231, 241, respectively). The control system portion 120 may control the turret lens assembly 280 to rotate along axis 284 to select a turret lens (e.g., having a magnification of 1×, 2×, 4×, or 6×, etc.) through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The motion control interface 132 may include a position control element 132a, and a speed/acceleration control element 132b although such elements may be merged and/or indistinguishable. The lighting control interface 133 may include lighting control elements 133a-133n, that control, for example, the selection, power, and on/off switch for the various corresponding light sources of the machine vision inspection system 100.

The memory 140 may include an image file memory portion 141, an enhanced measurement memory portion 140en (as will be described in greater detail below), a workpiece program memory portion 142 that may include one or more part programs, or the like, and a video tool portion 143. Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs". Video tools may include, for example, edge/boundary detection tools, autofocus tools, shape or pattern matching tools, dimension measuring tools, and the like.

The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. Examples of the operations of such video tools for locating edge features and performing other workpiece feature inspection operations are described in more detail in certain of the previously incorporated references, as well as in U.S. Pat. No. 7,627,162, which is hereby incorporated herein by reference in its entirety.

The video tool portion 143 also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed, as described in more detail in U.S. Pat. No. 9,143,674, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool. High-speed autofocus and/or focus position determination for an image region or regions of interest may be based on analyzing the image to determine a corresponding quantitative contrast metric for various regions, according to known methods. For example, such methods are disclosed in U.S. Pat. Nos. 8,111,905; 7,570,795; and 7,030,351, each of which is hereby incorporated herein by reference in its entirety.

In the context of this disclosure, and as is known by one of ordinary skill in the art, the term "video tool" generally refers to a relatively complex set of automatic or programmed operations that a machine vision user can implement through a relatively simple user interface. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. It should be noted that the visible user interface features are sometimes referred to as the video tool, with the underlying operations being included implicitly.

In common with many video tools, the enhanced measurement subject matter described herein includes both user interface features and underlying image processing operations, and the like, and the related features may be characterized as features of an enhanced measurement mode 143en included in the video tool portion 143. The majority of video tools are implemented for a particular instance of analysis in relation to a particular feature or region of interest, perform their function, and then cease operation. In contrast, it will be appreciated that in some embodiments the enhanced measurement mode features disclosed herein may be applied globally to enhanced measurement determinations, and may generally persist and continue to operate, until they are explicitly terminated by a user. While a user may experience the features of the enhanced measurement mode 143en described below primarily as an operating mode (e.g., as part of an operating state), alternative implementations and/or user interface features may also be provided (e.g. an enhanced measurement video tool, etc.) Thus, it should be appreciated that characterizing the enhanced measurement subject matter of this description as an operating mode in the following description is a matter of choice for description, and it is not intended to be limiting with regard to its appearance to the user, or its manner of implementation. One of ordinary skill in the art will appreciate that the circuits and routines underlying the enhanced measurement features disclosed herein may be implemented as distinct elements, in some embodiments.

In one embodiment, the enhanced measurement mode 143en may be selected by a user to enhance the accuracy of certain measurements (e.g., distance measurements) in a machine vision inspection system 100. In certain implementations, the enhanced measurement mode 143en (e.g., as utilized in a second operating state) may be an alternative to a more typical measurement mode (e.g., as utilized in a first operating state), in which an encoder-based measurement portion is utilized for the position/distance measurements. In contrast, in the enhanced measurement mode 143en, techniques comprising acquisition of images including measurement markings may be utilized as part of the measurement process (e.g., in such a way as to increase the accuracy of the distance measurements, in particular for distances between features that are separated by more than one field of view). A corresponding enhanced measurement accuracy may thus be higher than an encoder-based measurement accuracy. It is noted that certain relatively higher accuracy encoder-based measurement portions may be relatively expensive and/or complex to implement, for which certain machine vision inspection systems may not include such higher-end components (e.g., instead utilizing relatively less accurate encoder-based measurement portions) and for which the utilization of an enhanced measurement mode/state for achieving higher accuracy in such systems may be particularly beneficial.

In some implementations, an enhanced measurement mode/state may in particular be utilized with a machine vision system that may have a less accurate/less expensive encoder-based as an alternative to requiring a machine vision system with a highly accurate/expensive encoder-based measurement portion In one embodiment, the enhanced measurement mode 143en may include a portion that provides enhanced measurement operations/mode control 143enomc, with a portion for enhancement parameters and operations 143enpo and a portion that provides an enhanced measurement user interface 143enui. In various implementations, the enhanced measurement user interface 143enui may provide/include features such as an enhanced measurement state indicator, an enhanced measurement state activation element, etc. For example, an enhanced measurement state indicator (e.g., a second operating state indicator) may indicate when the enhanced measurement operating state (e.g., utilizing an enhanced measurement mode to determine a distance measurement) is active. The enhanced measurement activation element may be operated by a user to at least one of a) start and b) stop the enhanced measurement operating state. The enhanced measurement operations/mode control 143enomc may perform operations (e.g. image analysis operations, memory management, etc.), to configure and support operation of the enhanced measurement mode 143en. In one embodiment, the enhanced measurement mode 143en may also be linked or otherwise act in conjunction with certain known position/distance measurement operations or tools.

Alternative configurations are possible for the enhanced measurement mode 143en. In general, it will be appreciated that the enhanced measurement techniques described herein may be implemented in any now known or later-developed form that is operable in conjunction with the machine vision inspection system 100 to provide the features disclosed herein in relation to the measurement operations.

In general, the memory portion 140 stores data usable to operate the vision system components portion 200 to capture or acquire an image of the workpiece 20 such that the acquired image of the workpiece 20 has desired image characteristics. The enhanced measurement memory portion 140en may be controlled by the enhanced measurement operations/mode control 143enomc to store and/or recall the various data used by the enhanced measurement mode 143en. The memory portion 140 may also contain data defining a graphical user interface operable through the input/output interface 130. The memory portion 140 may also store inspection result data, may further store data usable to operate the machine vision inspection system 100 to perform various inspection and measurement operations on the acquired images (e.g. implemented, in part, as video tools), either manually or automatically, and to output the results through the input/output interface 130.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision components portion 200. The display devices 136 may display user interface features associated with the enhanced measurement user interface 143enui.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

These analysis and inspection methods that are used to inspect features in a workpiece image are typically embodied in the various video tools (e.g. video tools 143a, 143n, etc.) included in the video tool portion 143 of the memory 140, as outlined above. Many known video tools, or "tools" for short, are included in commercially available machine vision inspection systems, such as the QUICK VISION® series of vision systems and the associated QVPAK® software, discussed above.

As noted above, the enhanced measurement mode 143en is distinct from the more traditional encoder-based measurement mode of a typical machine vision inspection system. In a typical machine vision inspection system, a measurement of the distance between two features that are in different images/different fields of view is traditionally determined by the difference in the stage positions plus the difference in the feature positions in the respective images, wherein the stage (i.e. image) positions are traditionally determined by position encoders. In contrast, in the enhanced measurement mode 143en, techniques comprising acquisition of images including measurement markings may be utilized as part of the measurement process (e.g., in such a way as to increase the accuracy of the distance measurements, in particular for distances between features that are separated by more than one field of view).

The video tool portion 143 also includes Z-height measurement tools portion 143z, which provides various operations and features related to Z-height measurement operations. In one implementation, the Z-height measurement tools portion 143z may include Z-height tools 143zt (e.g., including an autofocus tool, a multipoint autofocus tool, etc.). The Z-height tools 143zt may govern certain aspects of image stack acquisition and related pattern projection operations and processing in conjunction with the Z-height tools that are configured in a mode that determines best focus heights and/or Z-height measurements (e.g., as part of points from focus type operations, etc.). Briefly, the Z-height measurement tools portion 143z may perform at least some operations similarly to known Z-height measurement tools, for example, performing operations in learn mode and run mode for generating all or parts of focus curves, and finding peaks as best focus positions, etc.

Various machine vision metrology applications known in the art, such as machine vision metrology software tools configured to determine precise edge locations of a workpiece and/or distances between the edge locations (commonly referred to as "edge tools", such as provided as tools of the video tool portion 143), may be used to identify the edge locations of the measurement markings and the features of the workpiece according to various embodiments of the present disclosure. For example, point, line or box tools, as known in the machine vision metrology field, may be used to analyze an image acquired by the imaging system 34' with scanning lines to produce contrast curves based on pixel intensity (gray) values (e.g., a contrast curve analysis). Edge locations of the measurement markings and the features of the workpiece may be determined as corresponding to peaks of the contrast curves where the largest contrast is observed in the image.

Figure 3:
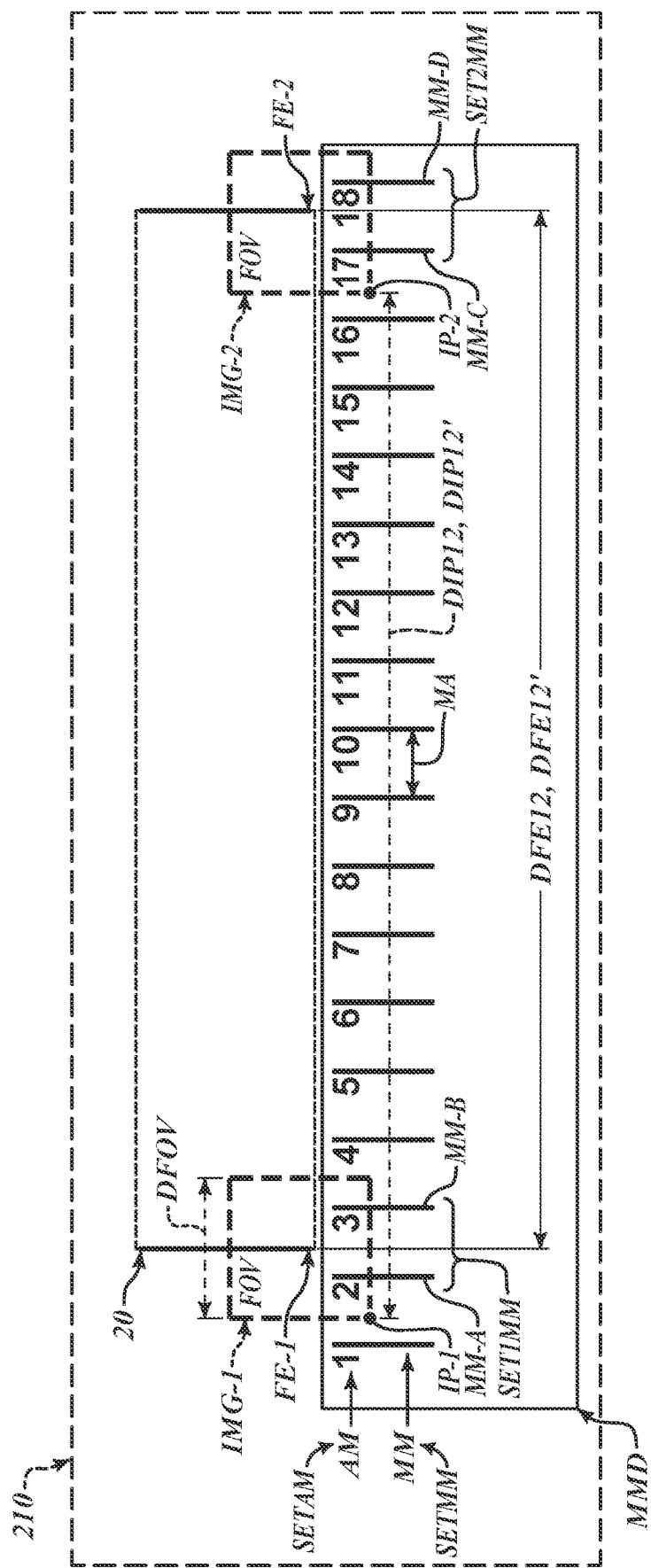
FIG. 3 is diagram of a workpiece and a measurement marking device located on a stage of a machine vision system such as that of FIGS. 1 and 2, and illustrating first and second images that include features of the workpiece and measurement markings of the measurement marking device.

FIG. 3 is diagram of a workpiece 20 and a measurement marking device MMD located on a stage 210 of a machine vision system such as that of FIGS. 1 and 2, and illustrating first and second images IMG-1 and IMG-2 that include features of the workpiece 20 and measurement markings of the measurement marking device MMD. The machine vision inspection system 100 described above may be used to make measurements based on the first and second images IMG-1 and IMG-2. For example, the machine vision inspection system 100 may be configured to provide first and second operating states, wherein the first operating state comprises utilizing the encoder-based measurement portion XYMP to determine a distance measurement (e.g., between features of the workpiece 20), while the second operating state (e.g., an enhanced measurement operating state) comprises utilizing the first and second images IMG-1 and IMG-2 to achieve measurement determinations with enhanced accuracy.

Referring to FIG. 3, in the second operating state (e.g., an enhanced measurement operating state), the imaging system 34' is used to acquire the first image IMG-1 at a first image position IP-1. The first image IMG-1 includes a first feature FE-1 of a workpiece 20 and a first measurement marking set SET1MM that comprises one or more measurement markings MM (e.g., measurement markings MM-A and MM-B) of a measurement marking device MMD (e.g., wherein the measurement marking device MMD, such as a ruler, is located on the stage 210 with the workpiece 20, such as being placed on the stage 210 next to the workpiece 20 by a user).

Then, a first relative position of the first feature FE-1 of the workpiece 20 in the first image IMG-1 is determined. For example, the first relative position may be in relation to at least one measurement marking of the first measurement marking set SET1MM that is in the first image IMG-1, such that an interpolated position of the first feature FE-1 between two measurement markings MM-A and MM-B in the first image IMG-1 may be determined, along a measuring axis direction MA of the measurement marking device MMD. In various implementations, the first relative position may be in relation to at least one measurement marking at least in part in accordance with a location where the measurement marking device MMD is placed by a user on the stage 210 prior to the acquisition of the first image IMG-1 at the first image position IP-1. Alternatively or additionally, the first relative position may be in relation to a specified reference location in the image, such as the reference location for the first image position IP-1 (e.g., as illustrated in the lower left corner of the image IMG-1 in the illustrated example).

Next, the movement mechanism 294XY is used to change the stage position relative to at least part of the imaging system 34' so that the imaging system 34' is directed toward a second image position IP-2 (e.g., wherein a distance DIP12 between the first image position IP-1 and the second image position IP-2 is greater than a corresponding dimension DFOV of a field of view (FOV) of the imaging system 34' at a current magnification).

The imaging system 34' is used to acquire a second image IMG-2 at the second image position IP-2, wherein the second image IMG-2 includes a second feature FE-2 of the workpiece 20, different than the first feature FE-1 of the workpiece 20, and a second measurement marking set SET2MM that comprises one or more measurement markings MM (e.g., measurement markings MM-C and MM-D) of the measurement marking device MMD. As in the illustrated example, typically, the first image IMG-1 and the second image IMG-2 do not overlap, and the first image IMG-1 and the second image IMG-2, and correspondingly the first measurement marking set SET1MM and the second measurement marking set SET2MM, do not include any measurement markings MM in common.

Then, a second relative position of the second feature FE-2 of the workpiece 20 in the second image IMG-2 is determined. For example, the second relative position may be in relation to at least one measurement marking of the second measurement marking set SET2MM that is in the second image IMG-2, such that an interpolated position of the second feature FE-2 between two measurement markings MM-C and MM-D in the second image IMG-2 may be determined, along a measuring axis direction MA of the measurement marking device MMD. Alternatively or additionally, the second relative position may be in relation to a specified reference location in the image, such as for the reference location of the second image position IP-2 (e.g., as illustrated in the lower left corner of the image IMG-2 in the illustrated example).

Next, a distance measurement DFE12' (of an actual distance DFE12) between the first feature FE-1 of the workpiece 20 and the second feature FE-2 of the workpiece 20 is determined, based at least in part on the first relative position, the second relative position and a distance between a measurement marking of the first measurement marking set SET1MM and a measurement marking of the second measurement marking set SET2MM.

In various implementations, the distance between a measurement marking of the first measurement marking set SET1MM and a measurement marking of the second measurement marking set SET2MM is determined based at least in part on at least one of: (a) image processing including image recognition of absolute markings AM associated with the measurement markings MM of the first and second measurement marking sets (e.g., absolute markings AM-A, AM-B, AM-C and AM-D, see FIGS. 9 and 10), for which the absolute markings indicate absolute position values along the measurement marking device MMD; or (b) a distance measurement provided by the encoder-based measurement portion XYMP.

When the distance between a measurement marking of the first measurement marking set SET1MM and a measurement marking of the second measurement marking set SET2MM is determined at least in part on (b), the distance measurement provided by the encoder-based measurement portion XYMP (FIG. 2) may be utilized to disambiguate which of the possible known distances between measurement markings MM in two different images is the correct distance between the respective measurement markings MM. For example, in certain implementations the measurement marking device MMD may not include any absolute markings AM and/or one or both of the images may not include any absolute markings AM of the measurement marking device MMD (e.g., as not included in the images and/or that are not recognized by the image processing of the images). In such instances, rather than utilizing absolute markings AM, a distance measurement provided by the encoder-based measurement portion XYMP may be utilized as a coarse measurement to disambiguate between the measurement markings MM for determining a more accurate distance measurement DFE12'. As a specific example, if the measurement markings MM in the second image IMG-2 are not identified with any absolute markings, the image processing may be unable to identify which measurement marking along the measurement marking device MMD the respective measurement marking in the second image IMG-2 corresponds to. However, since the measurement markings MM are known to each be spaced at a specified distance (e.g., 10 mm), the coarse distance provided by the encoder-based measurement portion XYMP may be utilized to narrow the possibilities to a specific corresponding value/distance for a respective measurement marking in the second image IMG-2 (e.g., as will be described in more detail below with respect to the examples of FIGS. 9 and 10).

In various implementations, the measurement marking device MMD (e.g., a ruler) may be placed on the stage 210 next to the workpiece 20 (e.g., as shown in FIG. 3). In some implementations, for example where at least one of the measurement marking device MMD or the workpiece 20 is at least partially transparent, the measurement marking device MMD may be placed at least partially underneath or on top of the workpiece 20 (e.g., as long as a sufficient number of the measurement markings MM and the features FE of the workpiece that are to be measured are visible in the images that are captured). In some embodiments, measurement marking devices MMD may be fabricated with highly accurate placements of the measurement markings MM, for example by utilizing a chrome-on-glass process for highly accurate placement/locations of the chrome measurement markings MM on the glass substrate.

A focusing issue may arise in that in some instances the measurement markings MM may be at different Z-height positions (e.g., different focus positions along the optical axis/z-axis of the imaging system 34') as compared to the features FE-1 and FE-2 of the workpiece 20. Accordingly, it may be desirable in some implementations for the images IMG-1 and IMG-2 to include image data corresponding to when the measurement markings MM are in focus, and image data corresponding to when the features FE-1 and FE-2 are in focus, as will be described in more detail below with respect to FIGS. 13 and 14.

In various implementations, scan lines and/or one or more edge tools are utilized to determine a location of at least one measurement marking MM of the first measurement marking set SET1MM in the first image IMG-1 and at least one measurement marking MM the second measurement marking set SET2MM in the second image IMG-2. Additionally or alternatively, scan lines and/or one or more edge tools may be utilized to determine a location of a feature FE of the workpiece 20, to thereby determine a relative position of a feature FE in an image IMG-1 or IMG-2. FIGS. 4-9 below will be described in terms of example operations of edge tools (e.g., point and box edge tools), which in certain embodiments may be, or may be analogous to, "video tools" which may utilize scan lines to determine edge locations.

For example, in various implementations tool 143a and/or tool 143n, etc. of the video tool portion 143 may be, or may include utilization of features of, edge tools, etc. It will be appreciated that in various implementations, similar operations (e.g., including utilization of scan lines or similar techniques) may be performed to determine edge locations, which may be performed automatically, in some cases without otherwise displaying and/or utilizing other features of the "video tool" or other tool type features illustrated and described below with respect to the simplified examples of FIGS. 4-9. Various analogous video tools are described in U.S. Pat. Nos. 7,003,161; 7,030,351; 7,522,763; 7,567,713; and 7,627,162, each of which is hereby incorporated herein by reference.

Figure 4:
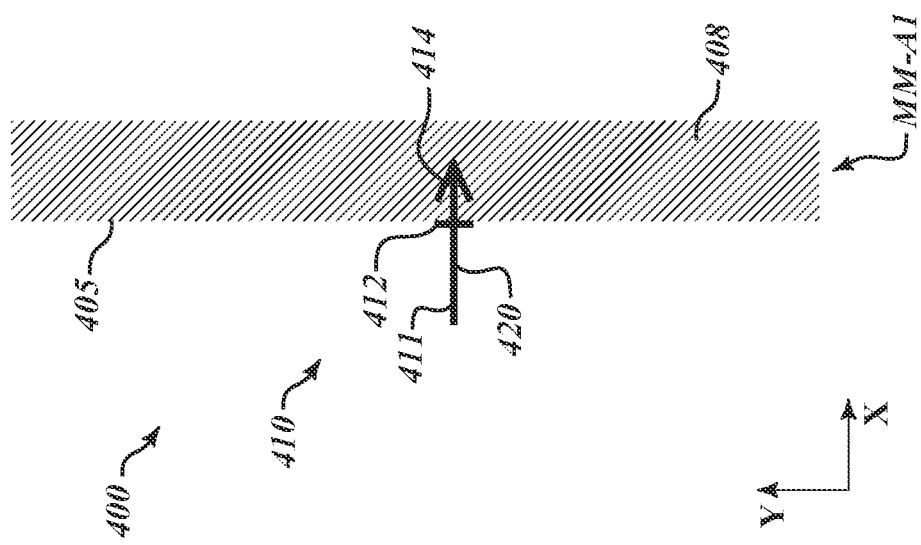
FIG. 4 is a diagram of an exemplary point tool overlaying a first (e.g., left) edge of a measurement marking (e.g., of the measurement marking device) in an image.

FIG. 4 is a diagram of an exemplary point tool 410 overlaying a first edge 405 of a measurement marking (MM-A1) (e.g., a measurement marking of the measurement marking device MMD, see FIG. 3) at the boundary of a darker or shaded area 408 in an image 400 such as acquired by the imaging system 34'. In FIG. 4, as well as figures described below, shaded areas such as the shaded area 408 are shown for purposes of illustration, to indicate pixels with relatively higher "gray values" in an image which are assumed in these examples to correspond to the areas of the measurement markings. In various implementations, higher gray values may correspond to relatively lower intensity pixels, or relatively higher intensity pixels, depending on the configuration.

As will be described in more detail below, the point tool 410 may be configured for determining the location of an edge point on an edge in the image, and similar operations may underlie the operation of another type of tool (e.g. a box-type edge tool) that locates multiple edge points on an edge, as will be described in more detail below in reference to FIG. 5. In certain implementations, the point tool 410 may include a body 411, an edge selector 412, and a polarity indicator arrowhead 414. The arrowhead 414 may generally point from light-to-dark, or dark-to-light, across an edge to enhance edge-finding reliability in certain situations, as explained in the incorporated references. In the illustration of FIG. 4, the body 411 obscures a nominal scan line 420 defined by, and nominally coinciding with, the body 411. Scan lines (420 and 520) will also be illustrated and described in more detail below with reference to FIG. 5.

In various implementations, certain of the operations described below (e.g., utilizing the scan lines for determining an edge location) may be performed automatically by the machine vision inspection system 100 (e.g., without displaying the corresponding video tool features on a display).

In operation, the machine vision inspection system 100 may be configured to automatically select and utilize a point tool and/or corresponding operations (e.g., utilizing scan line(s)) or a user may select the point tool 410 or corresponding operations. The system or user may identify an edge feature to be detected by placing the body 411 over the edge feature and placing the edge selector 412 as close as possible to the edge, at a desired location along the edge. The point tool body 411 may be oriented to define and indicate a desired scan line orientation across the edge (e.g., which for simplicity in the illustrated example is parallel to the x-axis of the illustrated x-y coordinate system but may alternatively be at an angle relative to the x and y axes within the x-y coordinate system in certain implementations). In FIG. 4, and other figures herein, image pixels are arranged in rows along the x-coordinate direction and columns along the y-coordinate direction. The arrow 414 points along a reference direction or polarity to be associated with the edge detection. In operation, once the point tool 410 is configured (and/or once corresponding operations are automatically determined and/or performed), the instructions of an underlying edge point locating routine may be executed to perform operations that analyze intensity profile data points (e.g., pixel intensity data) associated with a scan line that nominally coincides with the body 411 of the point tool 410, and perform various operations to detect the edge location of the underlying feature. As will be described in more detail below with respect to FIG. 5, in various exemplary embodiments, the edge point locating routine of the point tool 410 may determine an edge location based on the magnitude of the gradient along an intensity profile associated with the scan line.

Figure 5:
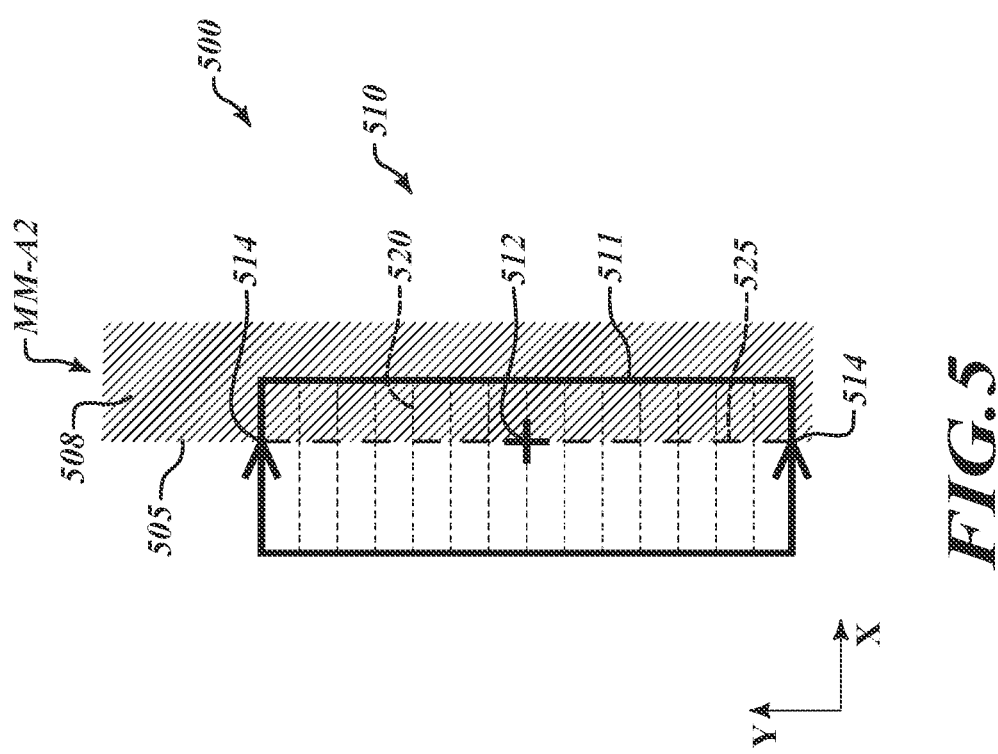
FIG. 5 is a diagram of an exemplary box tool overlaying a first (e.g., left) edge of a measurement marking (e.g., of the measurement marking device) in an image.

FIG. 5 is a diagram of an exemplary box tool 510 overlaying a first edge 505 of a measurement marking MM-A2 at the boundary of a shaded area 508 (corresponding to the measurement marking) in an image 500. In various implementations, the box tool 510 may include a region of interest (ROI) indicator 511, polarity indicator arrows 514 along the side, and an edge selector 512 that is positioned on the desired edge to be detected. Within the box tool 510, nominal scan lines 520 may be indicated, which the box tool 510 generates and uses for determining edge points. Along each of the nominal scan lines 520, the box tool operates to determine an edge point of the underlying feature, as previously described for the scan line 420 of the point tool 410 of FIG. 4. As shown in FIG. 5, and as will be described in more detail below, a line 525 may be fit to the set of determined edge points, to determine the location and orientation of the edge 505.

In operation, the box tool 510 is selected and/or otherwise configured to identify an edge feature to be detected. The ROI indicator 511 may be positioned, sized and rotated (e.g., automatically or by an operator), such that the ROI includes the portion of the edge feature to be detected, and the edge selector 512 may be positioned to more precisely identify the edge to be detected at a desired location along the edge.

The ROI indicator 511 may be oriented to define and indicate a desired scan line orientation across the edge. More generally, the orientation of the overall ROI indicator 511, the portions of the ROI indictor that include the arrows 514, or the orientations of the nominal scan lines 520 and/or corresponding operations may each be used to define and/or indicate the scan line orientation. The arrows 514 define the polarity to be associated with the edge detection. Once the box tool 510 is configured, the instructions of an underlying edge point locating routine may be executed to perform operations that analyze intensity profile data to detect edge points along each of the scan lines and fit a line to the detected edge points, as described in greater detail below.

To summarize, in general, edge points may be determined by various tools and/or corresponding operations, which in various implementations may fit geometric forms to the edge points in order to determine locations of corresponding underlying image features (e.g., as part of a process for determining the precise locations of measurement markings MMs, features FEs of workpieces, etc.). In one conventional method of operating a tool, depending on the type of tool (e.g. point tool and box tool), one or more nominal scan lines are defined or generated (e.g., within a ROI or otherwise, such as according to defined tool parameters). For each nominal scan line, a set of intensity profile data point locations are determined that approximate the nominal scan line. Intensity values associated with the data point locations are determined, to define the intensity profile associated with the nominal scan line. Then, in one embodiment, an edge detection algorithm analyzes gradients along the intensity profile to find the location along the intensity profile that corresponds to the maximum gradient magnitude, as described in more detail below with reference to FIG. 6. The maximum gradient location along the intensity profile is used to determine the edge point location in the image that is associated with the nominal scan line.

Figure 6:
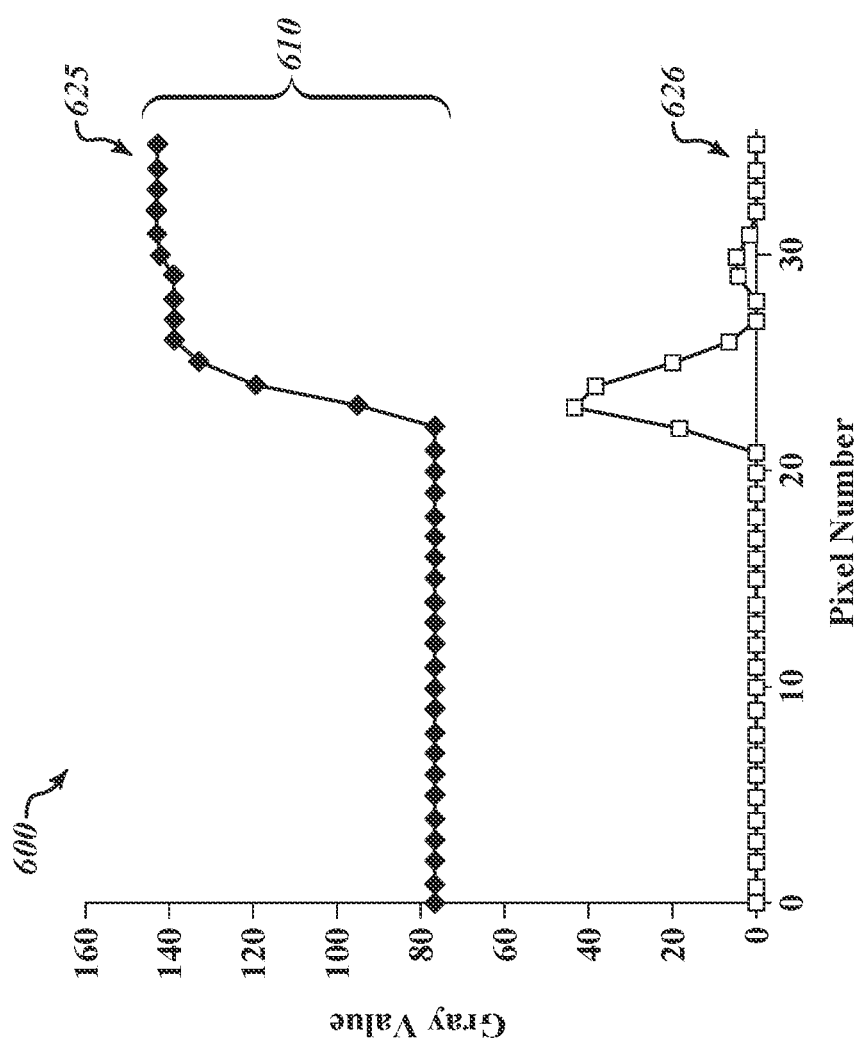
FIG. 6 is a diagram illustrating one exemplary method of determining a first edge location based on a set of pixel gray values.

FIG. 6 is a diagram of a graph 600 illustrating one exemplary method of determining an edge location based on an intensity profile 610. The intensity profile 610 comprises a set of image pixel intensity (gray) values 625 corresponding to positions of a scan line (e.g. such as one of the scan lines 420 or 520 shown in FIG. 4 or 5, respectively). The data points or positions representing the scan line are labeled as "Pixel Numbers" from 0-35 along the horizontal axis. Beginning from data point 0, the pixel intensity values initially indicate a relatively lighter region up to approximately data point 23, which is then followed by a relatively darker region up to data point 35.

It will be appreciated that the values and illustrations in FIGS. 4, 5 and 6 have been simplified in various respects with regard to the current examples. For example, in FIGS. 4 and 5 the determined edge location is illustrated as being between a relatively lighter region (e.g., near white) and a darker region, while in certain actual embodiments the "lighter region" may have a higher gray value (e.g., the surfaces of the micrometer head between the measurement markings may be medium gray), while the measurement markings may be relatively darker (e.g., as illustrated by the example "gray values" of FIG. 6). In addition, while the edges in FIGS. 4 and 5 are shown as being relatively "sharp" (i.e., with a relatively rapid transition between the lighter and darker regions), in certain actual embodiments the transition for the edges may occur over a number of pixels (e.g., as illustrated by the transition for the example gray values from the pixel 23 to the pixel 27 of FIG. 6).

Gradient magnitude values 626 are derived from the pixel intensity values 625 and are also shown in FIG. 6. Various conventional algorithms may be used to find the location along the horizontal axis that corresponds to a peak of the gradient magnitude (deemed to indicate the peak "contrast" between the pixel intensity values), and identify that location as an edge location. If there are multiple gradient magnitude peaks, then the video tool edge selector and/or orientation indicator (e.g. edge selector 412 and/or polarity indicator 414 of the point tool 410) may be used to assist the algorithm to identify the desired peak. In FIG. 6, the maximum gradient criterion (i.e., the gradient peak) indicates that the edge is located approximately at data point 23. By using methods that may include curve fitting, centroid determination, or the like, a gradient magnitude peak may be located relatively precisely between the intensity profile data points, which generally supports sub-pixel measurement resolution and repeatability when determining the location of the corresponding edge in the image. For example, while the gradient peak in the example of FIG. 6 is shown to be approximately at data point 23 (e.g., corresponding to pixel 23 in this example), it can be seen that another "near peak" occurs at data point 24 (pixel 24). This may indicate that a more precise determination of the edge location may correspond to a position between data points 23 and 24 (pixels 23 and 24), which may be determined by a process such as curve fitting, centroid determination, or the like. As a simplified concept, in an example where the data points 23 and 24 have a same gradient magnitude, such may correspond to an edge location exactly ½ way between the two (e.g., with an edge location corresponding to a data point/pixel location of 23.5).

It should be noted that each measurement marking actually has two edges (e.g., a right edge and a left edge for each vertical measurement marking), for which the "location" of the measurement marking for measurement purposes may be determined according to the middle as corresponding to an average between the two edges. Alternatively, if each measurement marking is only a few pixels wide or less, then the image pixel intensity (gray) values 625 graph of FIG. 6 may include a peak corresponding to the location of the narrow (e.g., few-pixels wide) measurement marking.

FIGS. 7-10 describe example operations of the image processing to determine the location of a measurement marking (e.g., or a feature of a workpiece) by determining the locations of two edges (e.g., right and left edges of a measurement marking).

Figure 7:
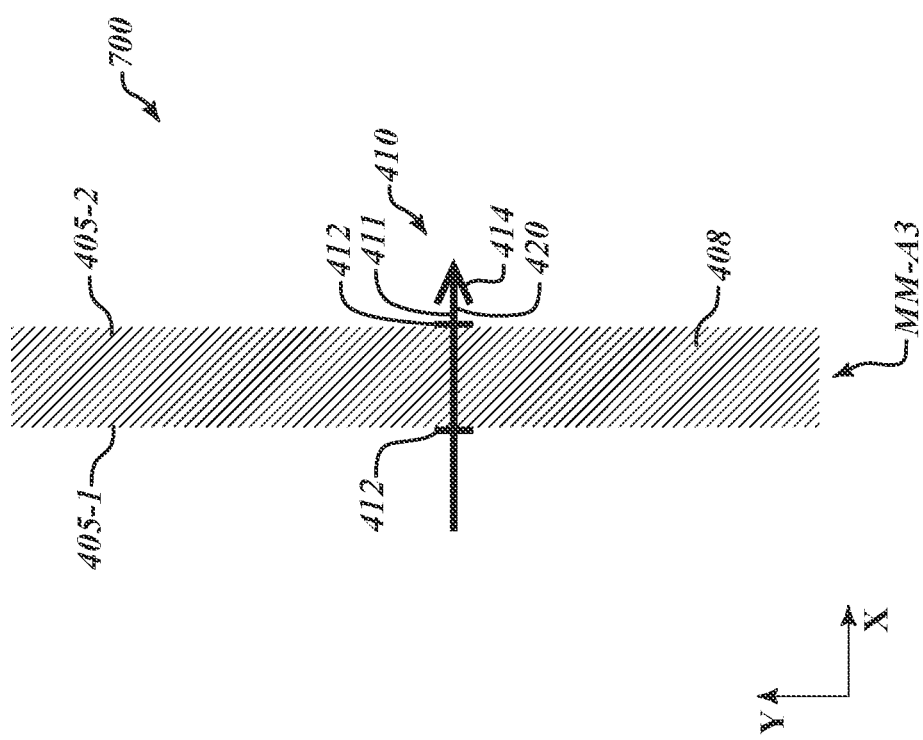
FIG. 7 is a diagram of an exemplary point tool overlaying first (e.g., left) and second (e.g., right) edges of a measurement marking (e.g., of the measurement marking device) in an image.

FIG. 7 illustrates operation of an exemplary point tool 410 similar to the point tool 410 described in FIG. 4 above, except that the point tool 410 of FIG. 7 additionally includes a second edge selector 412. Specifically, in FIG. 7, the exemplary point tool 410 is illustrated to overlay a first edge 405-1 and a second edge 405-2 of a shaded area 408 corresponding to a measurement marking MM-A3 in an image 700. The point tool 410 may include a body 411, a polarity indicator arrowhead 414, and first and second edge selectors 412 that are programmed to be automatically placed (or manually placed by a user) as close as possible to the first and second edges 405-1 and 405-2, respectively. The body 411 obscures a nominal scan line 420 used to generate contrast curves, as shown in FIG. 8.

Figure 8:
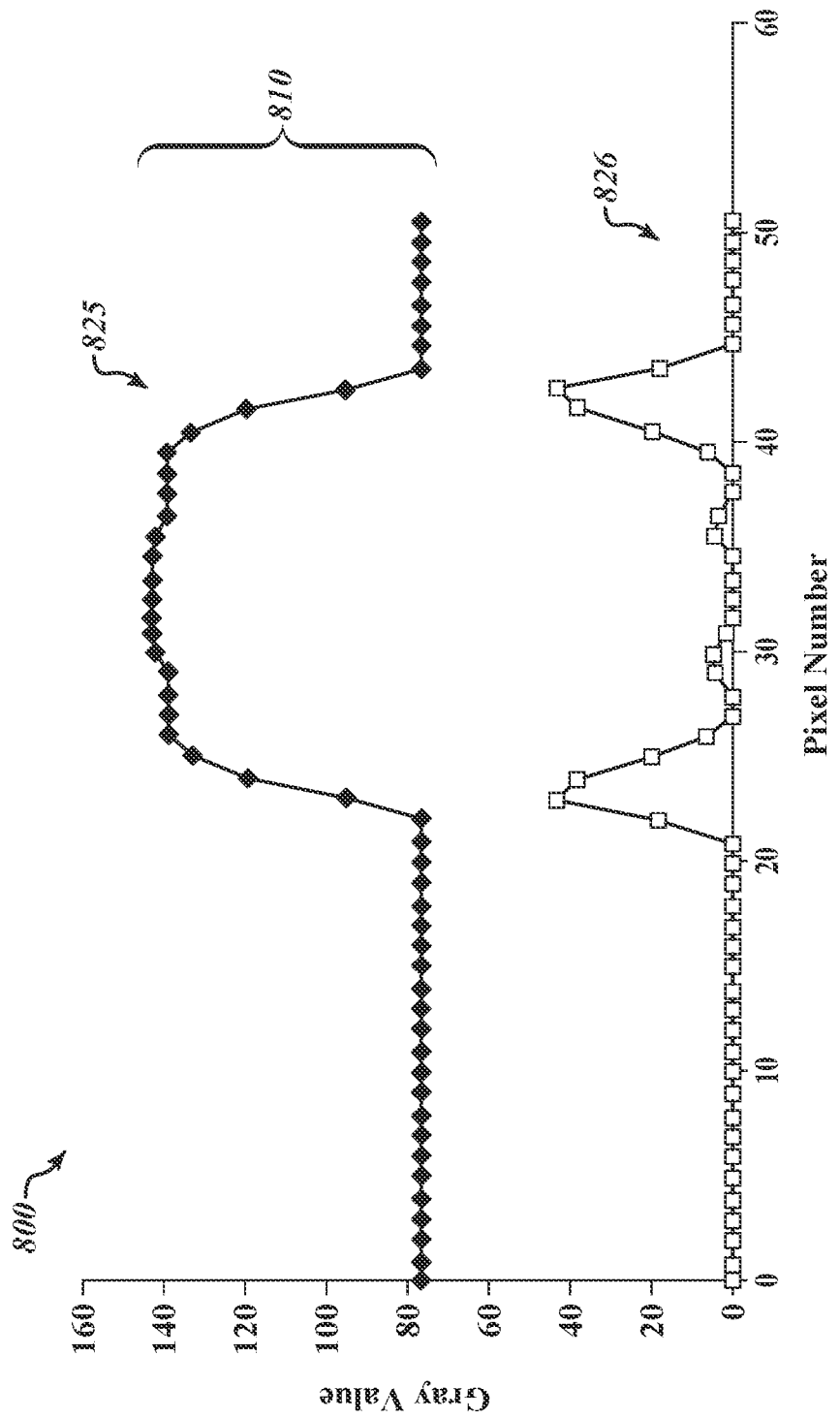
FIG. 8 is a diagram illustrating one exemplary method of determining first (e.g., left) and second (e.g., right) edge locations based on a set of pixel gray values.

FIG. 8 is a diagram of a graph 800 illustrating one exemplary method of determining the locations of the first and second edges 405-1 and 405-2 based on an intensity profile 810 produced based on scan line(s) 420. The intensity profile 810 comprises a set of image pixel intensity (gray) values 825 corresponding to positions of a scan line, such as the scan line 420 shown in FIG. 7. The data points or positions representing the scan line are labeled as "Pixel Numbers" from 0 to 50 along the horizontal axis. Beginning from data point 0, the pixel intensity values initially indicate a relatively lighter region up to approximately data point 23, which is then followed by a relatively darker region up to data point 43, which is then followed by another relatively lighter region up to data point 50. Thus, the width of the measurement marking (corresponding to the shaded area 408 in FIG. 7) may correspond to approximately 20 pixels (=43 pixels–23 pixels).

Gradient magnitude values 826 are derived from the pixel intensity values 825 and are also shown in FIG. 8. Various conventional algorithms may be used to find the locations along the horizontal axis that correspond to two peaks of the gradient magnitude (each indicating the peak "contrast" between the pixel intensity values), and identify those two locations as two edge locations of the measurement marking MM-A3. The location of the measurement marking MM-A3 may be determined based on the two edge locations, for example, by taking an average of the two edge locations to identify a middle position of a distance between the two edge locations, as will be more fully explained below in reference to FIGS. 9-12.

Figure 9:
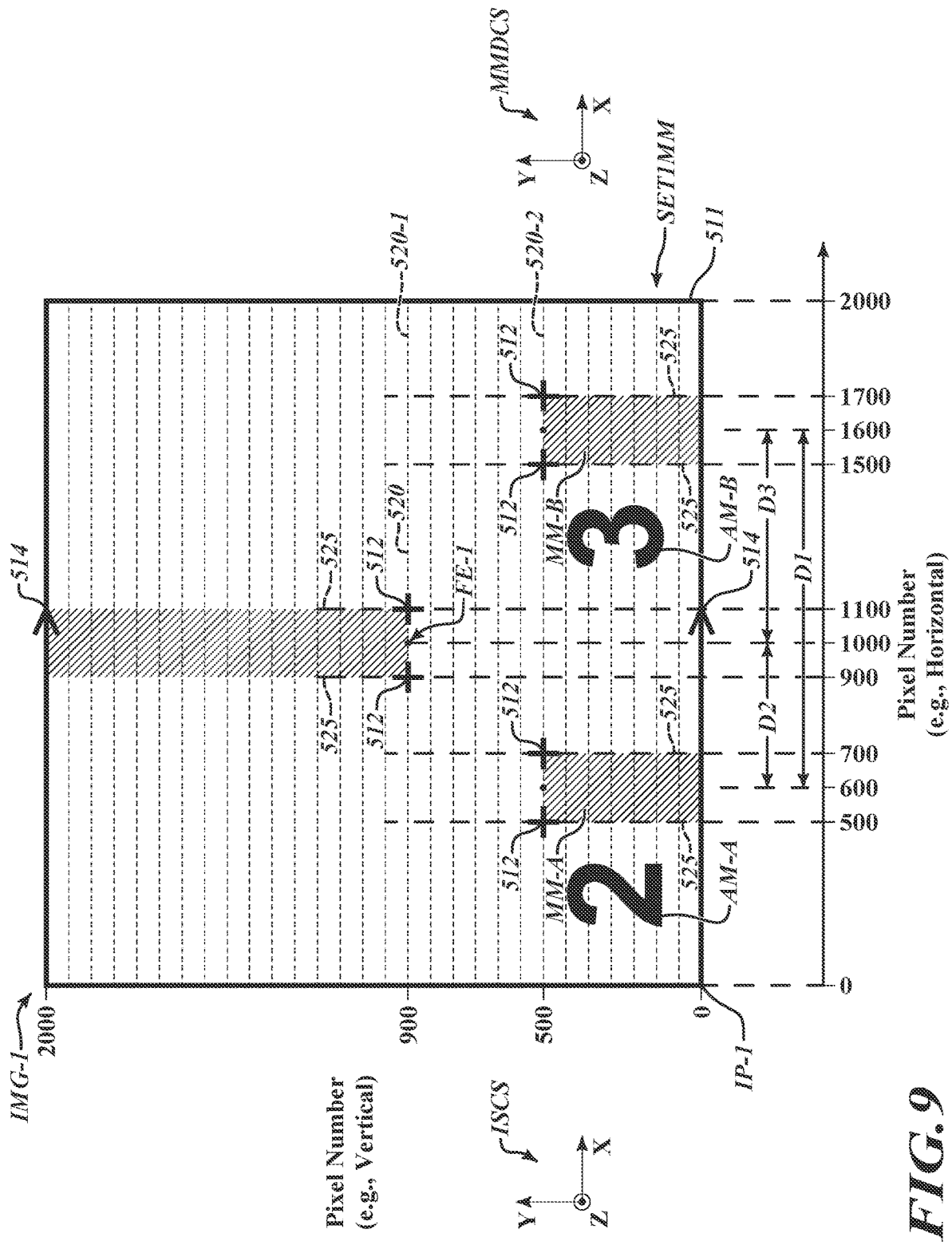
FIG. 9 is a diagram of the first image of FIG. 3, illustrating scan lines (e.g., of a box tool) overlaying the first feature of the workpiece and measurement markings of the first measurement marking set.
Figure 10:
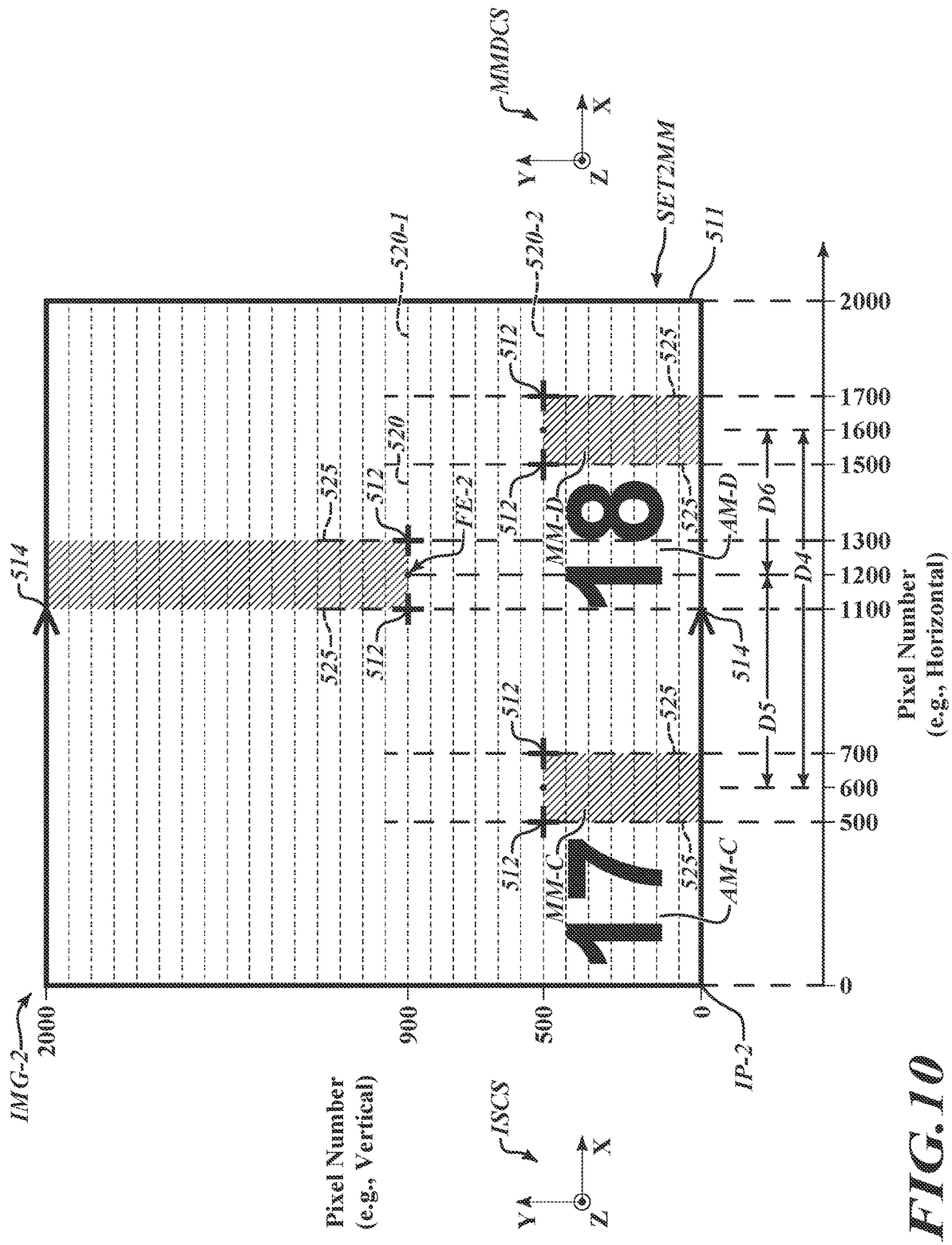
FIG. 10 is a diagram of the second image of FIG. 3, illustrating scan lines (e.g., of a box tool) overlaying the second feature of the workpiece and measurement markings of the second measurement marking set.

FIG. 9 is a diagram of the first image IMG-1 of FIG. 3, illustrating scan lines (e.g., of a box tool) overlaying the first feature FE-1 of the workpiece WP and measurement markings MM-A and MM-B of the first measurement marking set SET1MM. As indicated, the absolute markings AM-A and AM-B (i.e., corresponding to the numerals "2" and "3", respectively) correspond to the measurement markings MM-A and MM-B, respectively. FIG. 10 is a diagram of the second image IMG-2 of FIG. 3, illustrating scan lines (e.g., of a box tool) overlaying the second feature FE-2 of the workpiece WP and measurement markings MM-C and MM-D of the second measurement marking set SET2MM. As indicated, the absolute markings AM-C and AM-D (i.e., corresponding to the numerals "17" and "18", respectively) correspond to the measurement markings MM-C and MM-D, respectively.

For purposes of illustration of certain scan line principles, the box tools of FIGS. 9 and 10 (similar to a box tool such as that illustrated in FIG. 5 above) are illustrated as being approximately the same size as and covering the entire images IMG-1 and IMG-2 (e.g., although it will be appreciated that in various implementations certain smaller box tools with regions of interest that cover only part of an image and/or similar scan line processes may be utilized). In the particular illustrated examples, the full images IMG-1 and IMG-2 and/or regions of interest of the box tools have dimensions of approximately 2000 pixels×2000 pixels.

As illustrated in FIGS. 9 and 10, each of the box tools includes the region of interest (ROI) indicator 511. In the example of FIG. 9, the region of interest of the corresponding box tool may be used to define or detect two edges 525 of a first feature FE-1 of a workpiece 20 in an upper part of the image IMG-1, and two edges each of the first and second measurement markings MM-A and MM-B (e.g., of the measurement marking device MMD) in a lower part of the image IMG-1. For each of the first feature FE-1 of the workpiece 20 and the first and second measurement markings MM-A and MM-B, an edge selector 512 may overlay two edges 525 of a corresponding shaded area, as corresponding to the locations of the two edges along the x-axis in the illustrated example. In the example of FIG. 10, the region of interest of the corresponding box tool may be used to define or detect two edges 525 of a second feature FE-2 of a workpiece 20 in an upper part of the image IMG-2, and two edges each of the third and fourth measurement markings MM-C and MM-D (e.g., of the measurement marking device MMD) in a lower part of the image IMG-2. For each of the second feature FE-2 of the workpiece 20 and the third and fourth measurement markings MM-C and MM-D, an edge selector 512 may overlay two edges 525 of a corresponding shaded area, as corresponding to the locations of the two edges along the x-axis in the illustrated example.

In various implementations, these types of operations to determine the locations in the first image IMG-1 of the first feature FE-1 of the workpiece 20 and the first and second measurement markings MM-A and MM-B, and to determine the locations in the second image IMG-2 of the second feature FE-2 of the workpiece 20 and the third and fourth measurement markings MM-C and MM-D, may be performed with various sized box tools. For example, such operations may be performed with a single large box tool having the large region of interest (ROI) 511 such as shown in FIGS. 9 and 10, or with multiple uses of individual smaller tools as shown in FIGS. 4 and 5, or otherwise as performed using scan lines or similar operations (e.g., such as with or without other tool features as described above).

Figure 11:
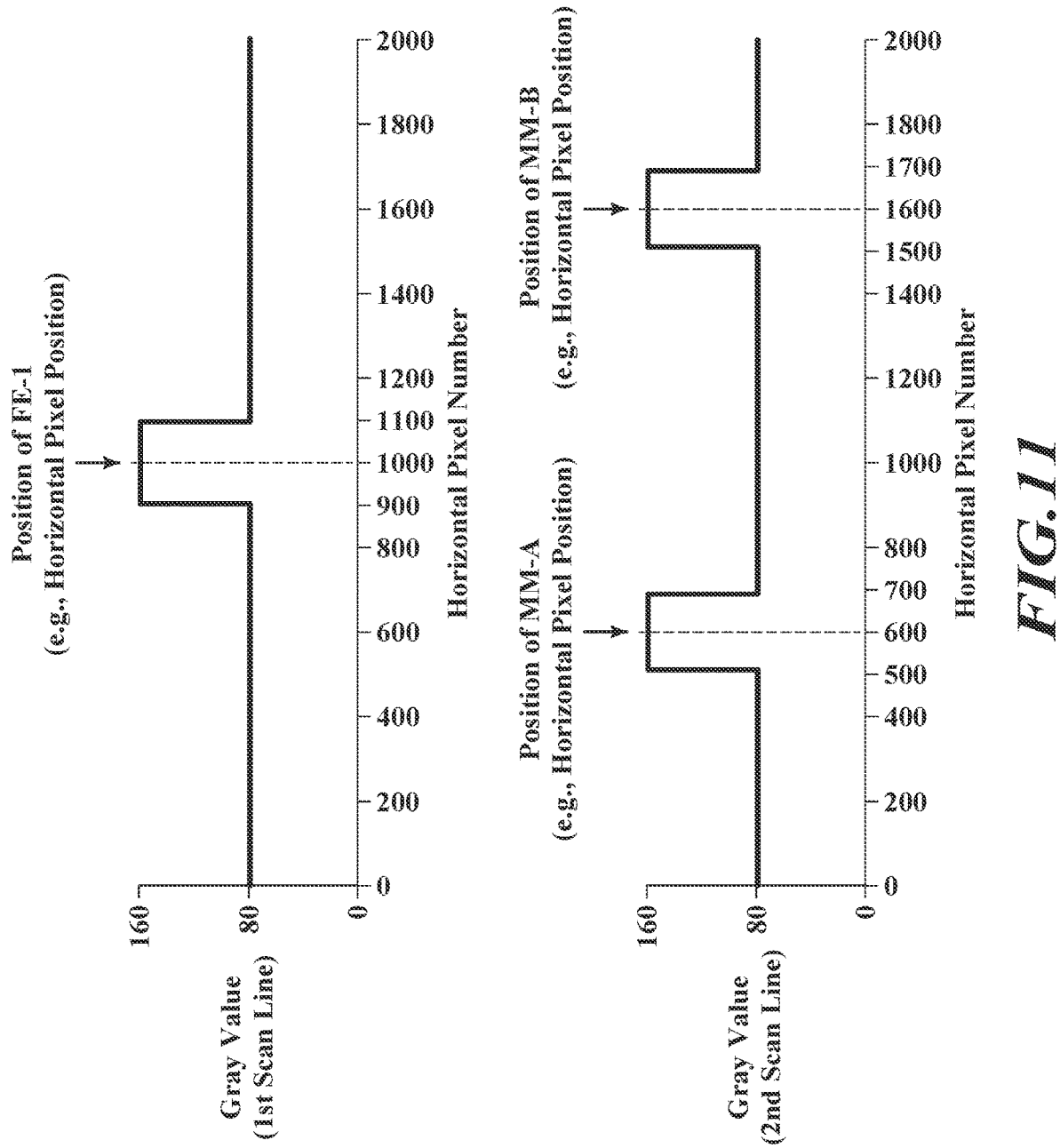
FIG. 11 is a diagram illustrating one exemplary method of determining, in relation to the aspects illustrated in FIG. 9, locations of the first feature of the workpiece and measurement markings of the first measurement marking set based on sets of pixel gray values.
Figure 12:
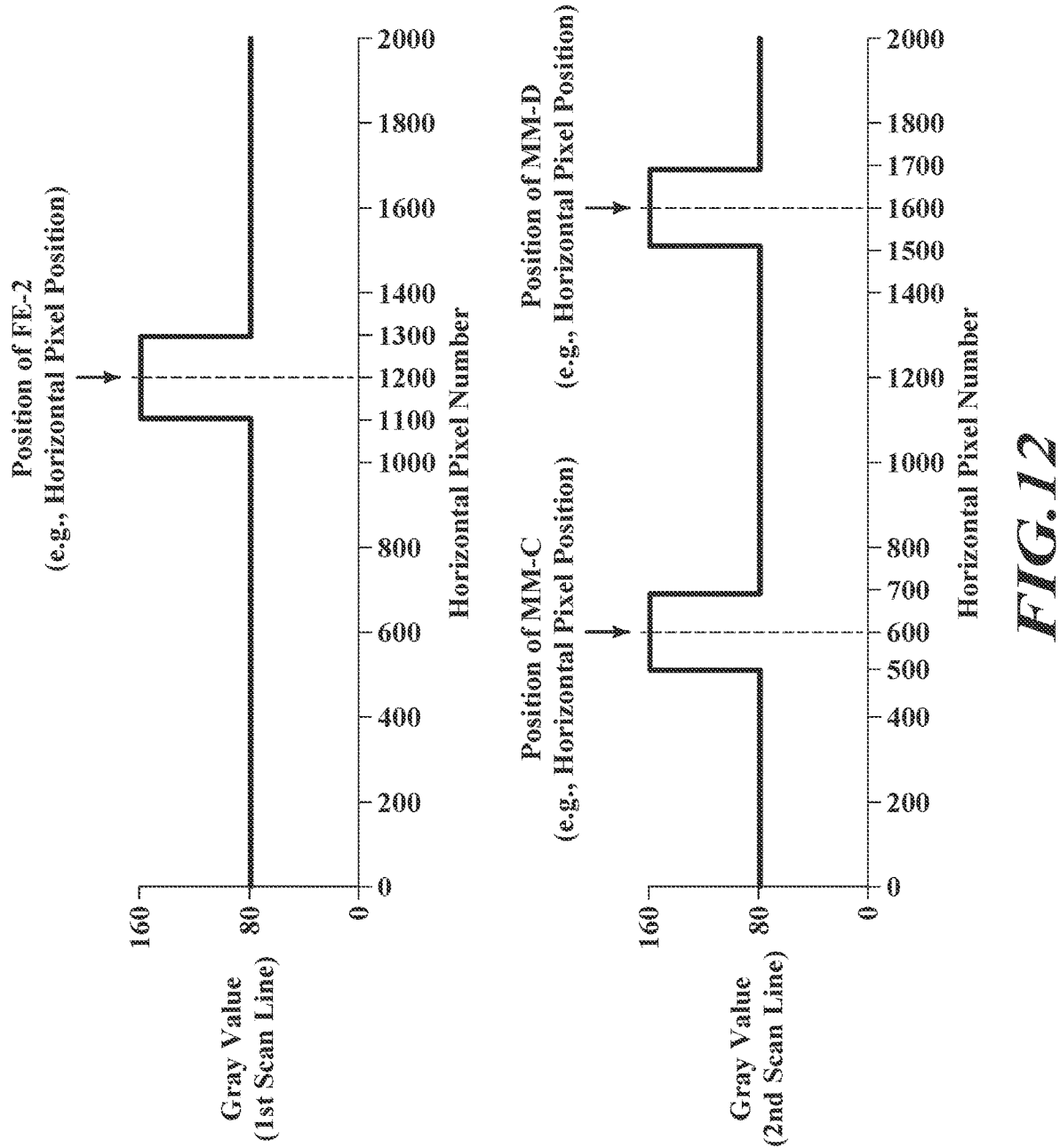
FIG. 12 is a diagram illustrating one exemplary method of determining, in relation to the aspects illustrated in FIG. 10, locations of the second feature of the workpiece and measurement markings of the second measurement marking set based on sets of pixel gray values.

FIG. 11 is a diagram illustrating one exemplary method of determining, in relation to the aspects illustrated in FIG. 9, locations of the first feature FE-1 of the workpiece 20 and measurement markings MM-A and MM-B of the first measurement marking set SET1MM based on sets of pixel gray values. FIG. 12 is a diagram illustrating one exemplary method of determining, in relation to the aspects illustrated in FIG. 10, locations of the second feature FE-2 of the workpiece 20 and measurement markings MM-C and MM-D of the second measurement marking set SET2MM based on sets of pixel gray values.

In FIGS. 11 and 12, the data points (pixel positions) are labeled as "Horizontal Pixel Number" from 0-2000 along the horizontal axis (e.g., which may correspond to the x-axis direction). The indicated pixels correspond to the pixels of the region of interest (ROI) indicator 511 of FIGS. 9 and 10, including 2000 pixels along the x-axis (i.e., the box tool in each instance has a width and height of 2000 pixels, with each horizontal scan line 520 extending over 2000 pixels). In FIGS. 11 and 12, the top graph in each instance indicates an intensity profile of the first and second features of the workpiece FE-1 and FE-2, respectively, in each case comprising a set of image pixel intensity (gray) values (e.g., indicating a relatively darker region from data points 900 to 1100 in FIG. 11, and indicating a relatively darker region from data points 1100 to 1300 in FIG. 12). The top graph in each instance in FIGS. 11 and 12 is generated based on a first scan line (or a first set of scan lines) 520-1 (e.g., which traverses the first feature FE-1 of the workpiece 20 as shown in FIG. 9 and which traverses the second feature FE-2 of the workpiece as shown in FIG. 10).

In FIGS. 11 and 12, the bottom graph in each instance indicates an intensity profile of two measurement markings (i.e., the measurement markings MM-A and MM-B in FIG. 11, and the measurement markings MM-C and MM-D in FIG. 12), in each case comprising a set of image pixel intensity (gray) values (e.g., indicating a first relatively darker region from data points 500 to 700 and a second relatively darker region from data points 1500 to 1700, in each of FIGS. 11 and 12). For simplicity of the present examples, the measurement markings MM-A and MM-B, and the measurement markings MM-C and MM-D, are indicated as having the same relative positions in the images IMG-1 and IMG-2, although it will be appreciated that in other instances the measurement markings may be in different relative positions in the respective images. The bottom graph in each instance in FIGS. 11 and 12 is generated based on a second scan line (or a second set of scan lines) 520-2 (e.g., which traverses the measurement markings MM-A and MM-B as shown in FIG. 9 and which traverses the measurement markings MM-C and MM-D as shown in FIG. 10).

In various implementations, certain relative positions (e.g., along the horizontal/x-axis direction) of the features of the workpiece and the measurement markings may be determined by taking an average of two data points. For example, in FIG. 11, by taking the average of the two edge data points, the position of the first feature FE-1 of the workpiece can be determined to be 1000, the position of the measurement marking MM-A can be determined to be 600, and the position of the measurement marking MM-B can be determined to be 1600. Then, referring additionally to FIG. 9, in accordance with one method the distance between the first and second measurement markings MM-A and MM-B along the x-axis may be calculated to be D1=1000 (=1600−600), the distance between the first measurement marking MM-A and the first feature FE-1 of the workpiece may be calculated to be D2=400 (=1000−600), and the distance between the first feature FE-1 of the workpiece and the second measurement marking MM-B may be calculated to be D3=600 (=1600−1000).

Similarly, in FIG. 12, by taking the average of the two edge data points, the position of the second feature FE-2 of the workpiece can be determined to be 1200, the position of the measurement marking MM-C can be determined to be 600, and the position of the measurement marking MM-D can be determined to be 1600. Then, referring additionally to FIG. 10, in accordance with one method the distance between the third and fourth measurement markings MM-C and MM-D along the x-axis may be calculated to be D4=1000 (=1600−600), the distance between the third measurement marking MM-C and the second feature FE-2 of the workpiece may be calculated to be D5=600 (=1200−600), and the distance between the second feature FE-2 of the workpiece and the fourth measurement marking MM-D may be calculated to be D6=400 (=1600−1200).

With respect to the process of determining a position by taking the average of two edge data points, it will be appreciated that in certain alternative processes a position may be determined utilizing other techniques. For example, in some instances a position of a feature of a workpiece may be determined in accordance with only a single edge data point. As another example, a position of a circular feature of a workpiece may be determined in accordance with a center of the circular feature.

With respect to the examples of FIGS. 9 and 10, in some implementations it may be useful to take data from several scan lines 520 such as a first set of scan lines 520-1 (e.g., including additional scan lines at different vertical/y-axis positions that extend over the edges of the feature FE-1 or FE-2) or a second set of scan lines 520-2 (e.g., including additional scan lines at different vertical/y-axis positions that extend over the edges of the measurement markings) in order to determine a precise location (e.g., a horizontal pixel location) of a feature or a measurement marking. For example, some measurement markings may have varying thickness across their x-axis dimension, for which taking an average as determined from a number of scan lines may help achieve a more precise determination of the horizontal pixel location of the measurement marking.

In various exemplary embodiments (e.g., as part of an enhanced measurement mode, such as utilized in an enhanced measurement state, which may alternatively be referenced as a second operating state), the machine vision inspection system 100 may determine relative positions (e.g., at least along the horizontal/x-axis direction) of features of a workpiece in respective images. In some implementations, the process may include determining interpolated positions of the features of the workpiece as between measurement markings. Various methods of performing such processing are possible. One non-limiting specific example for illustration purposes is described below. The process or method for determining interpolated positions includes:

(a) Determine a first relative position of a first feature FE-1 in a first image IMG-1. In certain implementations, the determining of the first relative position may include:

(a1) Evaluate the first image IMG-1 acquired by the imaging system 34' to determine a location of the first feature FE-1 of the workpiece, such as by using a contrast curve analysis as described above. In the illustrated example of FIGS. 9 and 11, the edges of the first feature FE-1 of the workpiece are at horizontal pixel locations of 900 and 1100 (e.g., as determined utilizing peaks of gradient magnitudes, such as illustrated at the bottoms of FIGS. 6 and 8). By taking the average of those two edge positions, the first feature of the workpiece is determined to have a horizontal pixel location of 1000 (=(900+1100)/2).

(a2) Evaluate the first image IMG-1 to determine the pixel locations of the two measurement markings of the first measurement marking set that the first feature FE-1 is closest to (e.g., that the first feature FE-1 is between in terms of the relative horizontal/x-axis direction positions), which are the first and second measurement markings MM-A and MM-B in the example of IMG-1. In the illustrated example of FIGS. 9 and 11, the first measurement marking MM-A is determined to have edges at 500 and 700, thus having an average pixel location at 600, and the second measurement marking MM-B is determined to have edges at 1500 and 1700, thus having an average pixel location of 1600. The full measurement marking increment distance D1 between the measurement markings MM-A and MM-B is therefore 1000 (=1600-600). If on the measurement marking device MMD the measurement markings MM-A and MM-B are spaced at a distance of 1 cm, aka 10 mm (i.e., corresponding to a measurement marking increment distance), and if in the first image IMG-1 the distance D1 between the measurement markings MM-A and MM-B is 1000 pixels, then each pixel in the image may correspond to a measurement dimension of approximately 0.01 mm.

(a3) Determine a partial measurement marking increment distance between the location of the first feature FE-1 of the workpiece and at least one of the two measurement markings MM-A and MM-B. In this example, a second distance D2 between the first measurement marking MM-A and the first feature FE-1 of the workpiece may be calculated to be 1000-600=400 pixels. In various implementations, this may be designated as a relative position of the first feature FE-1 of the workpiece in relation to the first measurement marking MM-A (e.g., for which the first relative position in relation to the first measurement marking MM-A along the x-axis is 400 pixels). As a possible alternative or additional calculation, a third distance D3 between the second measurement marking MM-B and the first feature FE-1 may be calculated to be 1600-1000=600 pixels. In various implementations, this may be designated as a relative position of the first feature FE-1 of the workpiece in relation to the second measurement marking MM-B.

(a4) Determine an interpolated position based at least in part on a ratio between the partial measurement marking increment distance (e.g., D2 corresponding to 400 pixels) and the full measurement marking increment distance (e.g., D1 corresponding to 1000 pixels). In the illustrated example, the interpolated position based on the partial measurement marking increment distance between the first measurement marking MM-A and the first feature of the workpiece is 40% (or 0.4) of the full measurement marking increment distance from the first measurement marking MM-A to the second measurement marking MM-B, which is 40% (or 0.4) of 10 mm=4.0 mm. It is noted that this also equates to 400 pixels×0.01 mm/pixel=4.0 mm, in accordance with the 0.01 mm/pixel calculation as described above. In various implementations, this may be referenced as a relative position of the first feature FE-1 (e.g., relative to the first measurement marking MM-A). As a possible alternative or additional calculation, an interpolated position may be determined based at least in part on a ratio between a partial measurement marking increment distance (e.g., D3 corresponding to 600 pixels) and the full measurement marking increment distance (e.g., D1 corresponding to 1000 pixels). In the illustrated example, the interpolated position based on the partial measurement marking increment distance between the second measurement marking MM-B and the first feature FE-1 of the workpiece is 60% (or 0.6) of the full measurement marking increment distance from the first measurement marking MM-A to the second measurement marking MM-B, which is 60% (or 0.6) of 10 mm=6.0 mm. It is noted that this also equates to 600 pixels×0.01 mm/pixel=6.0 mm, as described above. In various implementations, this may be referenced as a relative position of the first feature FE-1 (e.g., relative to the second measurement marking MM-B).

(b) Determine a second relative position of a second feature FE-2 in a second image IMG-2. In certain implementations, the determining of the second relative position may include:

(b1) Evaluate the second image IMG-2 acquired by the imaging system 34' to determine a location of the second feature FE-2 of the workpiece, such as by using a contrast curve analysis as described above. In the illustrated example of FIGS. 10 and 12, the edges of the second feature FE-2 of the workpiece are at horizontal pixel locations of 1100 and 1300 (e.g., as determined utilizing peaks of gradient magnitudes, such as illustrated at the bottoms of FIGS. 6 and 8). By taking the average of those two edge positions, the second feature of the workpiece is determined to have a horizontal pixel location of 1200 (=(1100+1300)/2).

(b2) Evaluate the second image IMG-2 to determine the pixel locations of the two measurement markings of the second measurement marking set that the second feature FE-2 is closest to (e.g., that the second feature FE-2 is between in terms of the relative horizontal/x-axis direction positions), which are the third and fourth measurement markings MM-C and MM-D. In the illustrated example of FIGS. 10 and 12, the third measurement marking MM-C is determined to have edges at 500 and 700, thus having an average pixel location at 600, and the fourth measurement marking MM-D is determined to have edges at 1500 and 1700, thus having an average pixel location of 1600. The full measurement marking increment distance D4 between the measurement markings MM-C and MM-D is therefore 1000 (=1600−600). If on the measurement marking device MMD the measurement markings MM-C and MM-D are spaced at a distance of 1 cm, aka 10 mm (i.e., corresponding to a measurement marking increment distance), and if in the second image IMG-2 the distance D4 between the measurement markings MM-C and MM-D is 1000 pixels, then each pixel in the image may correspond to a measurement dimension of approximately 0.01 mm.

(b3) Determine a partial measurement marking increment distance between the location of the second feature FE-2 of the workpiece and at least one of the two measurement markings MM-C and MM-D. In this example, a fifth distance D5 between the third measurement marking MM-C and the second feature FE-2 of the workpiece may be calculated to be 1200−600=600 pixels. In various implementations, this may be designated as a relative position of the second feature FE-2 of the workpiece in relation to the third measurement marking MM-C (e.g., for which the relative position in relation to the third measurement marking MM-C along the x-axis is 600 pixels). As a possible alternative or additional calculation, a sixth distance D6 between the fourth measurement marking MM-D and the second feature FE-2 may be calculated to be 1600−1200=400 pixels. In various implementations, this may be designated as a relative position of the second feature FE-2 of the workpiece in relation to the fourth measurement marking MM-D.

(b4) Determine an interpolated position based at least in part on a ratio between the partial measurement marking increment distance (e.g., D5 corresponding to 600 pixels) and the full measurement marking increment distance (e.g., D4 corresponding to 1000 pixels). In the illustrated example, the interpolated position based on the partial measurement marking increment distance between the third measurement marking MM-C and the second feature of the workpiece is 60% (or 0.6) of the full measurement marking increment distance from the third measurement marking MM-C to the fourth measurement marking MM-D, which is 60% (or 0.6) of 10 mm=6.0 mm. It is noted that this also equates to 600 pixels×0.01 mm/pixel=6.0 mm, as described above. In various implementations, this may be referenced as a relative position of the second feature FE-2 (e.g., relative to the third measurement marking MM-C). As a possible alternative or additional calculation, an interpolated position may be determined based at least in part on a ratio between a partial measurement marking increment distance (e.g., D6 corresponding to 400 pixels) and the full measurement marking increment distance (e.g., D4 corresponding to 1000 pixels). In the illustrated example, the interpolated position based on the partial measurement marking increment distance between the fourth measurement marking MM-D and the second feature FE-2 of the workpiece is 40% (or 0.4) of the full measurement marking increment distance from the measurement marking MM-C to the measurement marking MM-D, which is 40% (or 0.4) of 10 mm=4.0 mm. It is noted that this also equates to 400 pixels×0.01 mm/pixel=4.0 mm, as described above. In various implementations, this may be referenced as a relative position of the second feature FE-2 (e.g., relative to the fourth measurement marking MM-D).

In general, it is noted that one advantage of such techniques (e.g., utilizing interpolation between measurement markings, etc.), is that in various implementations a magnification and/or pixel size of the imaging system may not need to be known for the calculations, and for which the determined measurement distances may primarily be in relation to the measurement markings and relative scale of the measurement marking device MMD.

In various implementations, after a relative position of a first feature FE-1 in a first image IMG-1 and a relative position of a second feature FE-2 in a second image IMG-2 are determined (e.g., utilizing a process such as that described above or other process), a distance measurement (e.g., DFE12') of the distance DFE12 between the first and second features may be determined. In various implementations, the distance measurement DFE12' may be determined based at least in part on a first relative position (e.g., of the first feature FE-1 in the first image IMG-1), a second relative position (e.g., of the second feature FE-2 in the second image IMG-2), and a distance between a measurement marking (e.g., MM-A or MM-B) of the first measurement marking set SET1MM and a measurement marking (e.g., MM-C or MM-D) of the second measurement marking set SET2MM.

As a specific numerical example, the distance measurement may be determined based on the relative position of the first feature FE-1 in relation to the measurement marking MM-B in the first image IMG-1 (i.e., which as noted above equates to 6.0 mm), and the relative position of the second feature FE-2 in relation to the measurement marking MM-C in the second image IMG-2 (i.e., which as noted above equates to 6.0 mm), and the distance between the measurement markings MM-B and MM-C (i.e., which equates to 140 mm, in accordance with the absolute markings AB-B and AB-C indicating values of 3 cm and 17 cm, respectively, with a difference of 140 mm), for which the distance measurement DFE12' may equal 6.0 mm+6.0 mm+140 mm=152 mm.

As another specific numerical example, the distance measurement may be determined based at least in part on the relative position of the first feature FE-1 in relation to the measurement marking MM-A in the first image IMG-1 (i.e., which as noted above equates to 4.0 mm), which could be added to the absolute value indicated by the absolute marking AM-A of 2 cm as corresponding to the measurement marking MM-A, which would be 4.0 mm+20 mm=24 mm. The relative position of the second feature FE-2 in relation to the measurement marking MM-C in the second image IMG-2 (i.e., which as noted above equates to 6.0 mm) could be added to the value indicated by the absolute marking AM-C of 17 cm as corresponding to the measurement marking MM-C, which would be 6.0 mm+170 mm=176 mm. The distance measurement could then be calculated according to 176 mm−24 mm=152 mm. It is noted that this calculation is based at least in part on a relative position of the first feature FE-1 (e.g., in relation to the measurement marking MM-A) in the first image IMG-1, a relative position of the second feature FE-2 (e.g., in relation to the measurement marking MM-C) in the second image IMG-2, and a distance between the measurement marking MM-A and the measurement marking MM-C.

As another specific numerical example illustrating another way in which the calculation of the distance measurement DFE12' may be performed, the distance measurement may be determined based on the relative position of the first feature FE-1 in relation to the measurement marking MM-A in the first image IMG-1 (i.e., which as noted above equates to 4.0 mm), and the relative position of the second feature FE-2 in relation to the measurement marking MM-C in the second image IMG-2 (i.e., which as noted above equates to 6.0 mm), and the distance between the measurement markings MM-A and MM-C (i.e., which equates to 150 mm), for which the distance measurement may equal 6.0 mm−4.0 mm+150 mm=152 mm. The forgoing calculation in this simplified example is also noted to correspond to a distance between the image positions IP-1 and IP-2 and a difference between relative positions of the features FE-1 and FE-2 in the respective images IMG-1 and IMG-2. More specifically, due to the measurement markings MM-A and MM-C in this simplified example being in the same relative locations within the respective images IMG-1 and IMG-2, the distance between the measurement markings MM-A and MM-C is the same as the distance between the image positions IP-1 and IP-2, and correspondingly a difference between the relative positions of the features FE-1 and FE-2 in the respective images is the same regardless of whether the relative positions are in relation to the measurement markings MM-A and MM-C, or to a reference point at a same location in the respective images (e.g., at the indicators of the image positions IP-1 and IP-2 as arbitrarily designated as being referenced to the pixel location in the lower left corner of each of the images).

In a typical machine vision inspection system, a measurement of the distance between two features that are in different images (e.g., as corresponding to different non-overlapping images/fields of view) is traditionally determined by the difference in the stage positions (i.e., corresponding to image positions), plus the difference in the feature positions in the respective images, wherein the stage (i.e. image) positions are traditionally determined by position encoders (e.g., as may be utilized during and/or otherwise correspond to a first operating state as referenced herein, which may also be referenced as an encoder-based measurement operating state). In contrast, in the enhanced measurement mode 143en (e.g., as may correspond to a second operating state as referenced herein, which may also be referenced as an enhanced measurement operating state), in various implementations the feature positions in the respective images may in some instances still be determined in the same manner (or may be determined in other manners as described herein), and the difference in the stage (i.e. image) positions and/or other relevant differences in positions between the features may alternatively be determined through techniques as disclosed herein (e.g., determining and utilizing the relative positions of the measurement markings, etc.).

In these examples, the image positions IP-1 and IP-2 of the images IMG-1 and IMG-2 are arbitrarily designated as being referenced by the pixel location in the lower left corner of each of the images (e.g., although it will be appreciated that in various alternative implementations different reference pixel locations may be utilized, such as a pixel location in the upper right corner of each image, or in a center of each image, or as otherwise designated in each of the images). In relation to the above examples, as another specific numerical example, with the image position IP-1 referenced to the lower left corner of the image IMG-1, in accordance to the above techniques, this can be determined to be at a horizontal (e.g., x-axis) distance of 600 pixels from the measurement marking MM-A, and/or 1600 pixels from the measurement marking MM-B. In an implementation where a scale between the measurement markings MM-A and MM-B is determined as 1000 pixels, then the relative distance of IP-1 from the center of MM-A may be determined according to a ratio of 600/1000, or 0.6, which equates to 6 mm in accordance with the above noted calculations. In accordance with the absolute marking AM-A (i.e., indicating a 2.0 cm, aka 20 mm, position), the position of the IP-1 could be designated as being at a position of 2.0 cm−0.6 cm=1.4 cm (or 20 mm−6.0 mm=14 mm) in relation to the measurement markings on the measurement marking device MMD. The first feature FE-1 could be designated as having relative position in relation to IP-1 of 1000 pixels=10 mm, which in relation to the measurement markings on the measurement marking device MMD could be designated as 2.4 cm (or 24 mm).

Similarly, the position of IP-2 (i.e., which as noted in this simplified example is at a same position in relation to the respective measurement markings in the image IMG-2), could be designated as being at a position of 17 cm−0.6 cm=16.4 cm (or 170 mm−6.0 mm=164 mm) in relation to the measurement markings on the measurement marking device. The second feature FE-2 could be designated as having relative position in relation to IP-2 of 1200 pixels=1.2 cm=12 mm, which in relation to the measurement markings on the measurement marking device MMD could be designated as 17.6 cm (or 176 mm). In accordance with such calculations/determinations, in various implementations a distance measurement DFE12' between the first feature FE-1 and the second feature FE-2 may be determined in different ways. As one non-limiting example, the distance between the image positions IP-1 and IP-2 may be determined (e.g., according to position of IP-1 subtracted from position of IP-2=16.4 cm−1.4 cm=15.0 cm, or alternatively 164 mm−14 mm=150 mm) and combined with (e.g., added to) a difference between the relative positions of the features FE-1 and FE-2 in the respective images (e.g., according to the relative position of FE-1 subtracted from the relative position of FE-2=1.2 cm−1.0 cm=0.2 cm, or alternatively 12 mm−10 mm=2 mm, or alternatively 1200 pixels−1000 pixels=200 pixels, with a determined pixel scale of 0.001 cm/pixel, or 0.01 mm/pixel, for which 200 pixels=0.2 cm=2 mm), which in total results in a distance measurement DFE12' between the first feature FE-1 and the second feature FE-2 of 15 cm+0.2 cm=15.2 cm, or alternatively 150 mm+2.0 mm=152 mm.

In the above calculations for the distance between the image positions IP-1 and IP-2 (e.g., indicated as 164 mm−14 mm=150 mm), it is noted that in accordance with how IP-1 and IP-2 are determined as described above, a more detailed representation of this calculation would be (170 mm−6 mm)−(20 mm−6 mm)=150 mm. This is in accordance with image position IP-1 being determined in relation to measurement marking MM-A and the image position IP-2 being determined in relation to measurement marking MM-C. More specifically, as noted above, for the image position IP-1 at a horizontal distance of 600 pixels from the measurement marking MM-A, and in accordance with the absolute marking AM-A indicating a 2.0 cm, aka 20 mm, position, with the image position IP-1 being designated as being at 2.0 cm−0.6 cm=1.4 cm (or 20 mm−6.0 mm=14 mm). As also noted above, for the image position IP-2 at a horizontal distance of 600 pixels from the measurement marking MM-C, and in accordance with the absolute marking AM-C indicating a 17.0 cm, aka 170 mm, position, with the image position IP-2 being designated as being at 17.0 cm−0.6 cm=16.4 cm (or 170 mm−6.0 mm=164 mm). These relationships indicate how the determining of the distance measurement DFE12' between the first feature FE-1 and the second feature FE-2 utilizing such techniques is based at least in part on a distance between a measurement marking (e.g., MM-A) of the first measurement marking set SET1MM and a measurement marking (e.g., MM-C) of the second measurement marking set SET2MM.

As noted above, in various implementations, a calculation/determining of a distance between a measurement marking of the first measurement marking set SET1MM and a measurement marking of the second measurement marking set SET2MM may be based at least in part on image processing including image recognition of the absolute markings AM, as located proximate to and corresponding to the respective measurement markings MM. As an example, the calculation/determining of the distance between the measurement markings MM-B and MM-C may be based at least in part on image processing including image recognition of the absolute markings AM-B and AM-C, as located proximate to and corresponding to the measurement markings MM-B and MM-C, respectively. The absolute marking AM-B (i.e., represented as a numeral 3) may be recognized and processed as corresponding to a 3 cm marking on the measurement marking device MMD, while the absolute marking AM-C (i.e., represented as a numeral 17) may be recognized and processed as corresponding to a 17 cm marking on the measurement marking device MMD. Thus, a distance between the measurement markings MM-B and MM-C may be calculated/determined according to 17 cm−3 cm=14 cm=140 mm. Similar image recognition, processing and calculations/determinations of distances may be performed in relation to the absolute marking AM-A (i.e., represented as a numeral 2 which may be recognized and processed as corresponding to a 2 cm marking), as located proximate to and corresponding to the measurement marking MM-A, and the absolute marking AM-D (i.e., represented as a numeral 18 which may be recognized and processed as corresponding to a 18 cm marking), as located proximate to and corresponding to the measurement marking MM-D.

In various implementations, as an alternative to recognizing and utilizing absolute markings AM for determining part of a distance measurement, the encoder-based measurement portion XYMP (e.g., including one or more position encoders) may be utilized to determine a coarse position/distance (e.g., with an encoder-based measurement accuracy), that can be utilized to disambiguate between different measurement markings in the images. While the encoder-based measurement accuracy may be lower than that desired for certain applications, it may be utilized for the disambiguation. More specifically, the encoder-based measurement accuracy may be able to provide coarse position/distance information, which can be utilized to determine a measurement marking distance between measurement markings and/or relative identification of the measurement markings in different images.

As a specific numerical example, in one implementation, the encoder-based measurement portion XYMP may indicate that a measurement of the relative movement/distance DIP12 between the first image position IP-1 and the second image position IP-2 is approximately 149 mm, or in another example could indicate 151 mm (e.g., in either case according to 150 mm with a +/−1 mm error). In this simplified example, the measurement markings MM2 and MM17 are each in a same relative location within the respective images IMG-1 and IMG-2. In accordance with the known possible distances between two measurement markings (e.g., which are in 10 mm increments and so for example could be a distance of 140 mm, or 150 mm, or 160 mm), it can be determined that the coarse distance measurement provided by the encoder-based measurement portion XYMP (e.g., such as indicating 149 mm, or 151 mm), most likely corresponds to the 150 mm distance (i.e., as opposed to the 140 mm or 160 mm distances, in particular where the encoder-based measurement portion XYMP has a known characteristic of a +/−1 mm error). Thus the system (e.g., utilizing the enhanced measurement mode 143en) may determine a measurement distance DIP12' of 150 mm between the first image position IP-1 and the second image position IP-2 (e.g., as corresponding to an enhanced measurement accuracy which is higher than the encoder-based measurement accuracy). The control system portion/processor may make such determinations (e.g., in accordance with selecting an accurate value that is closest to the value from the encoder-based measurement portion XYMP, and/or according to any other method/mathematical process that may be utilized for the disambiguation of the measurement markings based on the coarse values from the encoder-based measurement portion XYMP).

Figure 13:
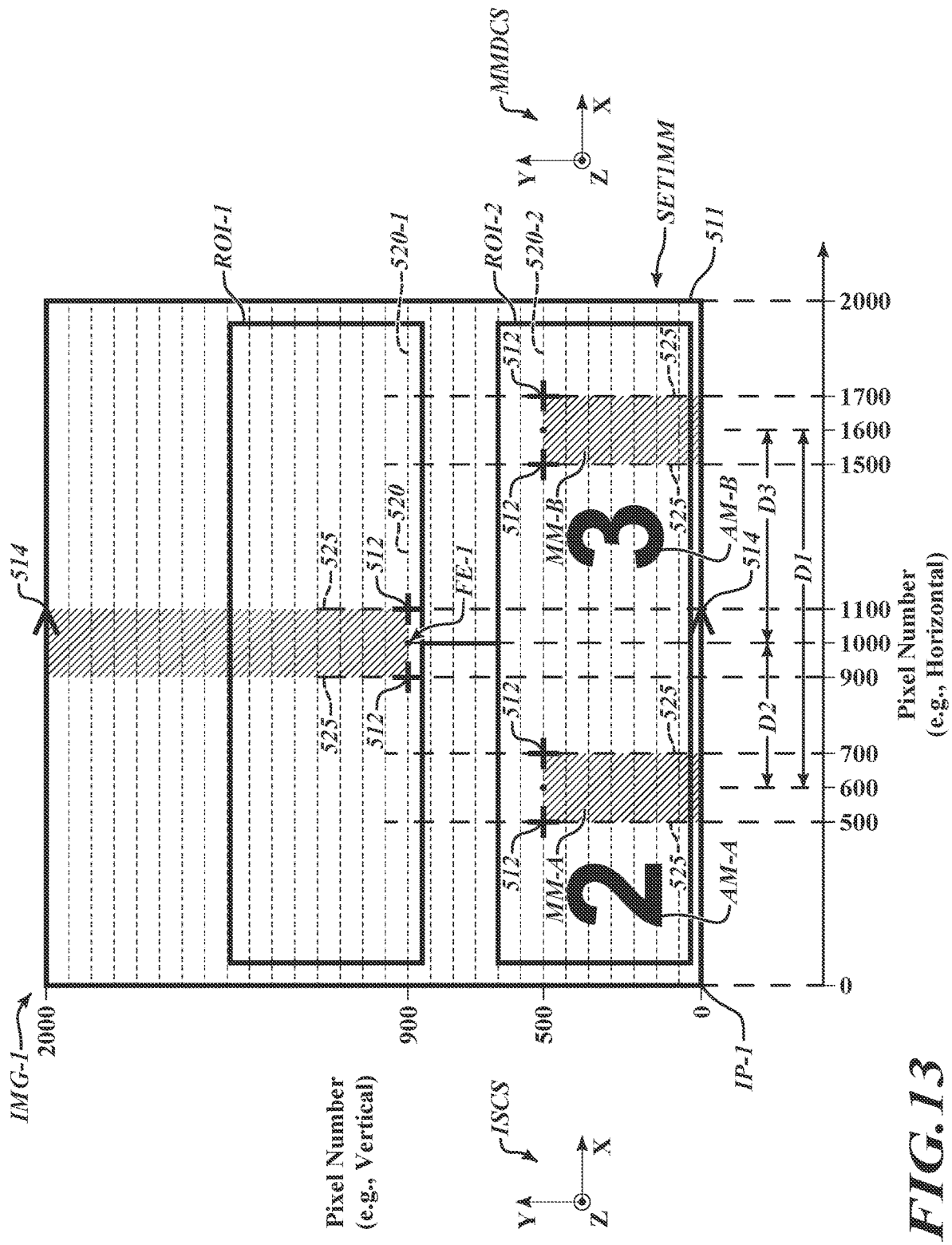
FIG. 13 is a diagram similar to FIG. 9, and further illustrating first and second regions of interest for which focus positions may be determined of the first feature and the measurement markings of the first measurement marking set.
Figure 14:
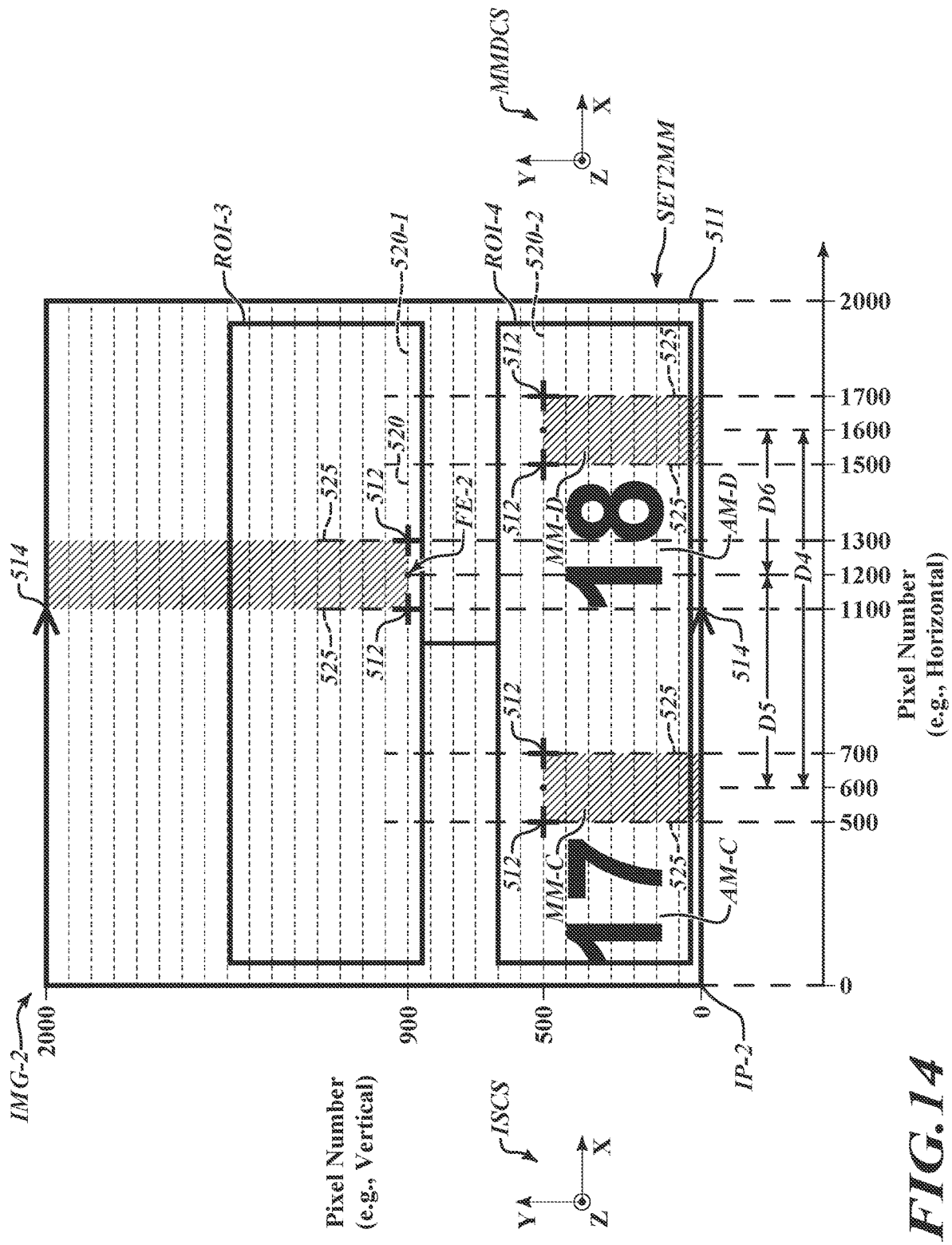
FIG. 14 is a diagram similar to FIG. 10, and further illustrating third and fourth regions of interest for which focus positions may be determined of the second feature and the measurement markings of the second measurement marking set.

FIG. 13 is a diagram similar to FIG. 9, and further illustrating first and second regions of interest ROI-1 and ROI-2, and FIG. 14 is a diagram similar to FIG. 10, and further illustrating third and fourth regions of interest ROI-3 and ROI-4. In various implementations, a focusing issue may arise in that the measurement markings may be at different Z-height positions (e.g., different focus positions along the optical axis/z-axis of the imaging system) as compared to the features FE-1 and FE-2 of the workpiece. For example, the measurement marking device MMD (e.g., a ruler) may be relatively flat and thin, and when placed on the stage 210 the measurement markings MM may be at a relatively low Z-height (e.g., relatively close to the surface of the stage 210). In contrast, in certain instances, the workpiece 20 may be relatively taller, for which the features FE-1 and/or FE-2 of the workpiece may be at relatively higher Z-heights. In relation to such differences, in certain implementations when the imaging system is focused at a Z-height (e.g., a focus position along the optical axis of the system) where the measurement markings MM are in focus, then the features FE-1 and FE-2 may not be in focus, and vice versa. An instance where either the measurement markings or the features are out of focus (e.g., blurry) in an image may result in inaccurate determinations of the relative positions (e.g., in accordance with scan lines or other techniques not being able to accurately determine the positions of the edges that are blurred, etc.)

In certain implementations, such issues may be addressed by having the images include image data corresponding to when each of the measurement markings and features of the workpiece are in focus. For example, the first image IMG-1 may comprise image data corresponding to the first feature FE-1 (e.g., as included in a first region of interest ROI-1) as acquired when the imaging system is focused at a first feature focus height, and image data corresponding to the first measurement marking set SET1MM (e.g., as included in a second region of interest ROI-2) as acquired when the imaging system is focused at a measurement marking focus height that is different than the first feature focus height. Similarly, the second image IMG-2 may comprise image data corresponding to the second feature FE-2 (e.g., as included in a third region of interest ROI-3) as acquired when the imaging system is focused at a second feature focus height, and image data corresponding to the second measurement marking set SET2MM (e.g., as included in a fourth region of interest ROI-4) as acquired when the imaging system is focused at the measurement marking focus height that is different than the second feature focus height.

In some implementations, such different image data may be captured through a process in which the imaging system is moved along the z-axis direction (e.g., by the movement mechanism 294Z) and/or by utilization of the variable focal length (VFL) lens 270 (e.g., a TAG lens) for acquiring the image data at the different focus heights. In various implementations, such processes may be controlled and/or provided by the enhanced measurement mode 143en and/or by the Z-height measurement tools portion 143z and/or the autofocus video tools 143af. As one example process utilizing the VFL lens 270, the VFL lens controller 180 may be utilized to control the VFL lens 270 to periodically modulate the focus position of the imaging system. First and second particular instances of strobed illumination (e.g., as provided by the lighting control interface 133) that correspond with first and second phase timings of the periodically modulated focus position may be provided that correspond to a respective first timing when the imaging system is focused at the feature focus height and a respective second timing of when the imaging system is focused at the measurement marking focus height.

In certain implementations, such a process may be performed for acquiring a single image (e.g., with the instance of strobed illumination at the different timings provided during a single image exposure, resulting in a single image with both the measurement markings and feature of the workpiece in focus). In other implementations, different images of the respective field of view may be acquired, such as with one image including the feature of the workpiece in focus, and another image including the measurement markings in focus. In some implementations, the imaging system may include multiple camera portions (e.g., as part of a single camera or multiple cameras), such as with one camera portion positioned over and utilized for acquiring in-focus images of the measurement markings, and another camera portion positioned over and utilized for acquiring in-focus images of the features of the workpiece.

The image data from the images as acquired by processes such as those described above may be combined in a composite image, or otherwise utilized in combination for processing such as that described herein. In either case, in such instances, the first image IMG-1 as acquired by the imaging system in accordance with the processes as described herein, is regarded as comprising the image data corresponding to the first feature FE-1 (e.g., as included in at least a first region of interest ROI-1) as acquired when the imaging system is focused at a first feature focus height, and image data corresponding to the first measurement marking set SET1MM (e.g., as included in at least a second region of interest ROI-2) as acquired when the imaging system is focused at a measurement marking focus height that is different than the first feature focus height. Similarly, the second image IMG-2 as acquired by the imaging system in accordance with the processes as described herein, is regarded as comprising the image data corresponding to the second feature FE-2 (e.g., as included in at least a third region of interest ROI-3) as acquired when the imaging system is focused at a second feature focus height, and image data corresponding to the second measurement marking set SET2MM (e.g., as included in at least a fourth region of interest ROI-4) as acquired when the imaging system is focused at a measurement marking focus height that is different than the second feature focus height.

Figure 15:
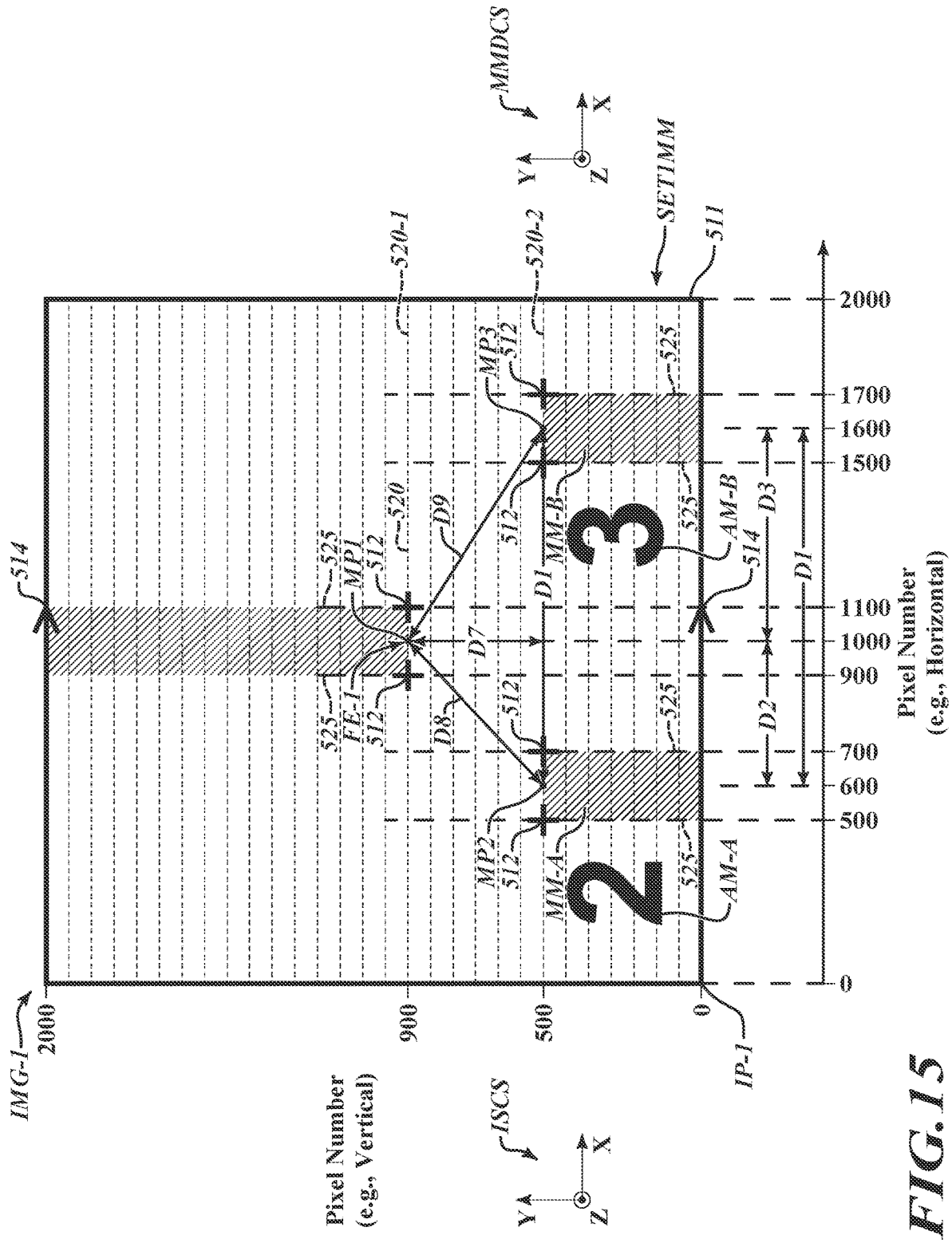
FIG. 15 is a diagram similar to FIG. 9, and further illustrating certain distances between the first feature and measurement markings of the first measurement marking set.
Figure 16:
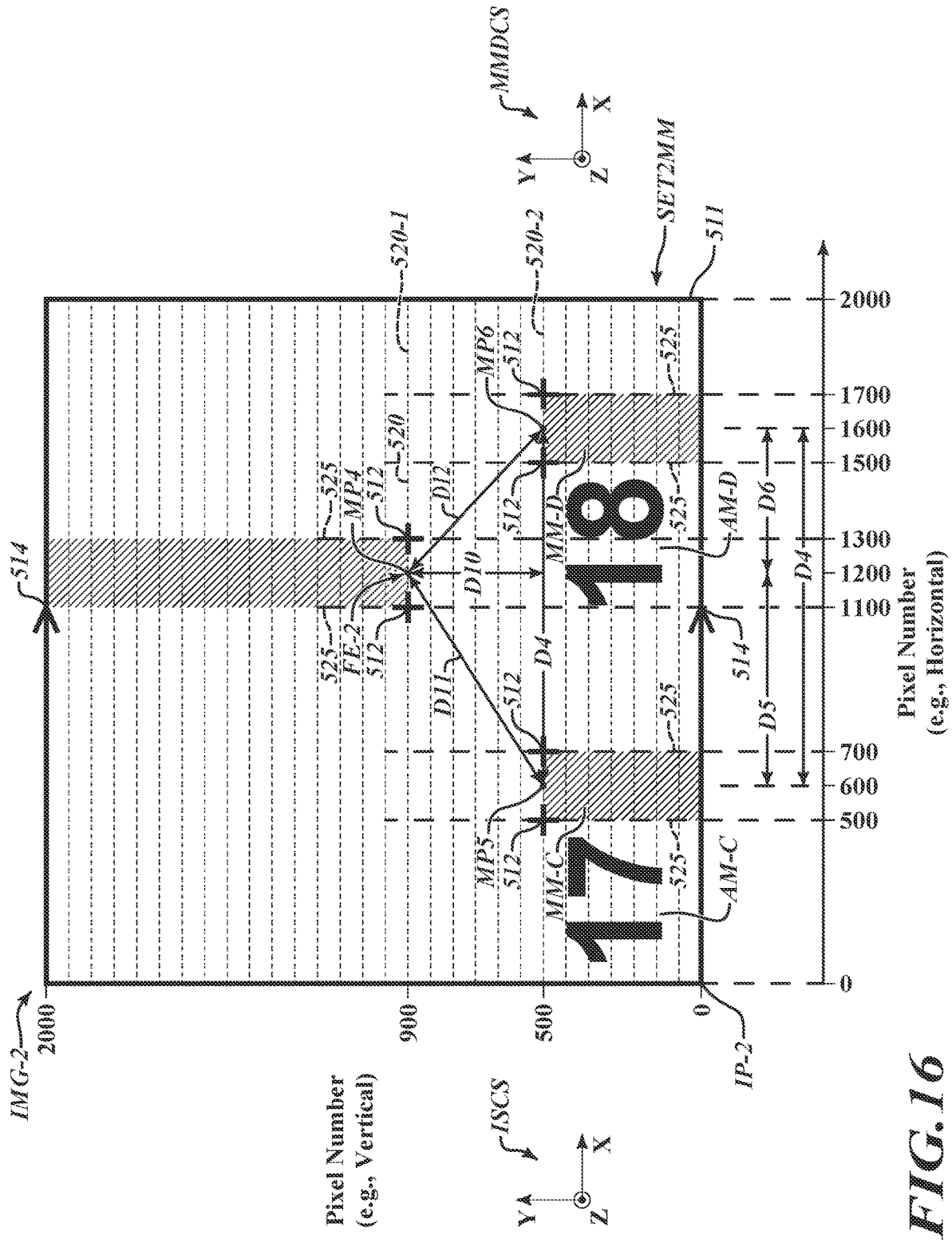
FIG. 16 is a diagram similar to FIG. 10, and further illustrating certain distances between the second feature and measurement markings of the second measurement marking set.

FIG. 15 is a diagram similar to FIG. 9, and further illustrating certain distances between the first feature FE-1 of the workpiece 20 and the measurement markings MM-A and MM-B of the first measurement marking set SET1MM. FIG. 16 is a diagram similar to FIG. 10, and further illustrating certain distances between the second feature FE-2 of the workpiece and the measurement markings MM-C and MM-D of the second measurement marking set SET2MM.

In various implementations, as illustrated in FIGS. 15 and 16 certain measurement points MP may be designated as corresponding to/representative of the positions of certain features and/or measurement markings (e.g., measurement points MP1 and MP4 for the features FE-1 and FE-2, respectively, and measurement points MP2, MP3, MP5 and MP6 for the measurement markings MM-A, MM-B, MM-C and MM-D, respectively). In various implementations, the x-axis coordinates of the measurement points MP may be determined in accordance with processes such as those described above (e.g., utilizing scan lines oriented along the x-axis direction to determine edge locations, and in some instances determining an average between the edge locations for determining a representative x-axis location of the feature or measurement marking). In various implementations, the y-axis coordinates of the measurement points MP may be determined in a similar manner (e.g., utilizing scan lines, such as scan lines oriented along the y-axis direction, such as part of a box tool, point tool, etc. or other process, for determining a representative y-axis location of an ending part of a feature or measurement marking, such as the horizontal ending edges indicated between the edge selectors 512 in the examples of FIGS. 15 and 16). In various implementations, z-axis coordinates of the measurement points MP may be determined in accordance with principles such as those described with respect to FIGS. 13 and 14 (e.g., wherein the z-axis coordinates correspond to the focus positions when the measurement markings and features are in focus) and/or in accordance with the utilization of the z-height measurement tools portion 143z, etc.

In various implementations, such principles/operations may also be regarded as having been performed in the examples of FIGS. 9-14 (although for which the measurement points MP are not expressly labeled in those figures, but will be understood from the explanations and labels in the examples of FIGS. 15 and 16). In various implementations, measurement points MP for features and/or measurement markings may also be determined in other ways and/or as corresponding to other representative locations for the features/measurement markings (e.g., a measurement point MP for a circular feature may be determined in accordance with a center of the circular feature, as may be determined by a circle tool utilizing radial scan lines, etc.)

One specific example of a process for determining certain relevant dimensions may utilize certain determined pixel coordinates (e.g., of certain specified reference points, etc.) For example, in relation to the example of FIGS. 15 and 16, certain techniques (e.g., utilizing edge tools, scan lines, etc.) may be utilized to determine the pixel coordinates of the measurement points MP1 and MP4 (e.g., as corresponding to the positions of the first and second features FE-1 and FE-2 of the workpiece) and of the measurement points MP2, MP3, MP5 and MP6 (e.g., as corresponding to the positions of the measurement markings MM-A, MM-B, MM-C and MM-D, respectively). In the example of FIG. 15, the measurement points MP1, MP2 and MP3 may be determined to have (x, y) pixel coordinates within the image IMG-1 of (1000, 900), (600, 500) and (1600, 500), respectively. In the example of FIG. 16, the measurement points MP4, MP5 and MP6 may be determined to have (x, y) pixel coordinates within the image IMG-2 of (1200, 900), (600, 500) and (1600, 500), respectively.

In an implementation where the measuring axis direction MA of the measurement marking device MMD is well aligned with the x-axis of the imaging system/images, the y-axis (e.g., vertical) distance D7 in image IMG-1 may be determined in accordance with the delta y between the y coordinate of the measurement point MP1, and the y coordinate of at least one of the respective measurement points MP2 or MP3. Similarly, the y-axis (e.g., vertical) distance D10 in image IMG-2 may be determined in one example in accordance with the delta y between the y coordinate of the measurement point MP4, and the y coordinate of at least one of the respective measurement points MP5 or MP6. As a specific numerical example, the distance D7 may be determined in accordance with the difference between the y coordinates of the measurement points MP1 and MP2, which is equal to 900−500=400 pixels=D7. The distance D10 could similarly be determined according to the difference between the y coordinates of the measurement points MP4 and MP5, which is equal to 900−500=400 pixels=D10.

It is noted that in various implementations, an indication of how well aligned the measurement marking device MMD is with the x-axis of the imaging system may be determined at least in part according to how close the y coordinates of the measurement markings in a given image are to being equal (e.g., in these examples in accordance with how close the y coordinates of the measurement points MP2 and MP3 are to being equal in the image IMG-1, as corresponding to the positions of the measurement markings MM-A and MM-B, and how close the y coordinates of the measurement points MP5 and MP6 are to being equal in the image IMG-2, as corresponding to the positions of the measurement markings MM-C and MM-D).

In various implementations, certain more detailed techniques may be utilized which may result in accurate distance measurements (e.g., including in instances where the measurement marking device MMD may be at a relative tilt such that it may be less well aligned with the x-axis of the imaging system/images. As an example, in accordance with the determined pixel coordinates of the measurement points MP1-MP6, the distances D1, D4, D8, D9, D11 and D12 may be determined in the images IMG-1 and IMG-2. As one possible technique, the distance D8 may be determined in accordance with its rise and run, in relation to the delta x and y of the difference between measurement points MP1 and MP2, with a delta x of 400 pixels and a delta y of 400 pixels, which in accordance to the triangle formula of $A^2+B^2=C^2$, and correspondingly with A=400 pixels, B=400 pixels, then $C^2$=(160000+160000), for which C=565.68 pixels=D8. The remaining distances D1, D4, D9, D11 and D12 may similarly be determined.

In this example, once the dimensions of the 3 sides of each triangle (i.e., as formed by the distances D1, D8 and D9 in image IMG-1 and the distances D4, D11 and D12) have been determined, then dimensions such as D2, D3, D5, D6, D7 and D10 may be determined. As one example technique, the 3 sides of each triangle may be utilized to determine the area of each triangle (e.g., in accordance with Heron's formula, where area=$((s-a)(s-b)(s-c))^{1/2}$, where s is half the perimeter, or (a+b+c)/2). Once the area is determined, the height of each triangle (e.g., corresponding to D7 in image IMG-1 and D10 in image IMG-2) may be determined in accordance with the triangle equation of height=2(area)/base. In the example of image IMG-1, this may equate to D7=2(area)/D1, for which once D7 is determined, the distances D2 and D3 may be determined (e.g., in accordance with the triangle equations $D2^2=D8^2-D7^2$ and $D3^2=D9^2-D7^2$). In the example of image IMG-2, this may equate to D10=2(area)/D4, for which once D10 is determined, the distances D5 and D6 may be determined (e.g., in accordance with the triangle equations $D5^2=D11^2-D10^2$ and $D6^2=D12^2-D10^2$). In various implementations, such calculations may be characterized as determining the corresponding dimensions in terms of a coordinate system MMDCS of the measurement marking device MMD (e.g., which is independent of how the measurement marking device MMD is aligned with the imaging system).

In accordance with the above examples, in certain implementations a distance measurement between the feature FE-1 (e.g., with a position corresponding to measurement point MP1) and the feature FE-2 (with a position corresponding to the measurement point MP2) may be determined as follows. A distance along the measuring axis direction MA of the measurement marking device MMD may be determined in accordance with techniques similar to those described above with respect to FIGS. 9-12. For example, the distance along the measuring axis direction MA may be determined in accordance with (the distance between measurement markings MM-B and MM-C)+D3+D5 (e.g., which in certain of the examples above equates to 140 mm+6 mm+6 mm=152 mm). In certain implementations, the pixel dimensions (e.g., of D3 and D5) may be converted to dimensions of the measurement marking device MMD (e.g., into cm or mm), in accordance with the distances D1 and D4 as corresponding to a known measurement dimension (e.g., if a spacing between measurement markings is known to be 10 mm, and with D1=1000 pixels, and with D4=1000 pixels, it can be determined that each pixel equates to a dimension of 0.01 mm). A distance perpendicular to the measuring axis direction MA of the measurement marking device MMD may be determined in accordance with a difference between the distances D7 and D10 (e.g., in accordance with: perpendicular distance=D10−D7). In examples where D7=D10 (e.g., in certain of the illustrated examples), this value equates to 0, for which the distance measurement between the features FE-1 and FE-2 (e.g., corresponding to the distance measurement between the measurement points MP1 and MP4) simply equates to the distance along the measuring axis direction MA (e.g., 152 mm in certain of the examples above).

As an illustrative example where D7 does not equal D10, a configuration may be provided similar to that in the examples above except in which D7=3.0 mm and D8=4.0 mm, and in which the distance between the features FE-1 and FE-2 along the measuring axis direction is 152 mm. In such an example, in accordance with the equation $A^2+B^2=C^2$, and with A=152 mm and B=D8−D7=1.0 mm, then C=$((152\ mm)^2+(1.0\ mm)^2)^{1/2}$=152.003 mm, which equates to the distance measurement between the feature FE-1 (e.g., with a position corresponding to measurement point MP1) and the feature FE-2 (with a position corresponding to the measurement point MP2). As noted above, in various implementations the z-axis coordinates of the measurement points may also be determined (e.g., utilizing processes such as those described in relation to FIGS. 13 and 14 and/or utilizing the z-height measurement tools portion 143z etc.), for which calculations similar to those noted above (e.g., as will be understood by one skilled in the art) may be performed for determining the distances between the measurement points (i.e., having x, y, z coordinates) in three dimensional space (e.g., for the determination of the distance measurement between the first and second features of the workpiece).

It is noted that in various implementations certain similar calculations may be performed for determining a distance measurement between the image positions IP-1 and IP-2 (e.g., with IP-1 and IP-2 substituted for measurement points MP1 and MP4 in the above determinations, and distances correspondingly determined between IP-1 and MP2 and MP3 in image IMG-1 and between IP-2 and MP5 and MP6 in image IMG-2, etc.) In some such implementations, a distance measurement between the features FE-1 and FE-2 may be determined by the difference between the image positions IP-1 and IP-2 (i.e., corresponding to stage positions) plus a difference between the positions of the features FE-1 and FE-2 in the respective images IMG-1 and IMG-2 (e.g., as may in certain implementations be in relation/referenced to a coordinate system ISCS of the imaging system/images, etc.).

Figure 17:
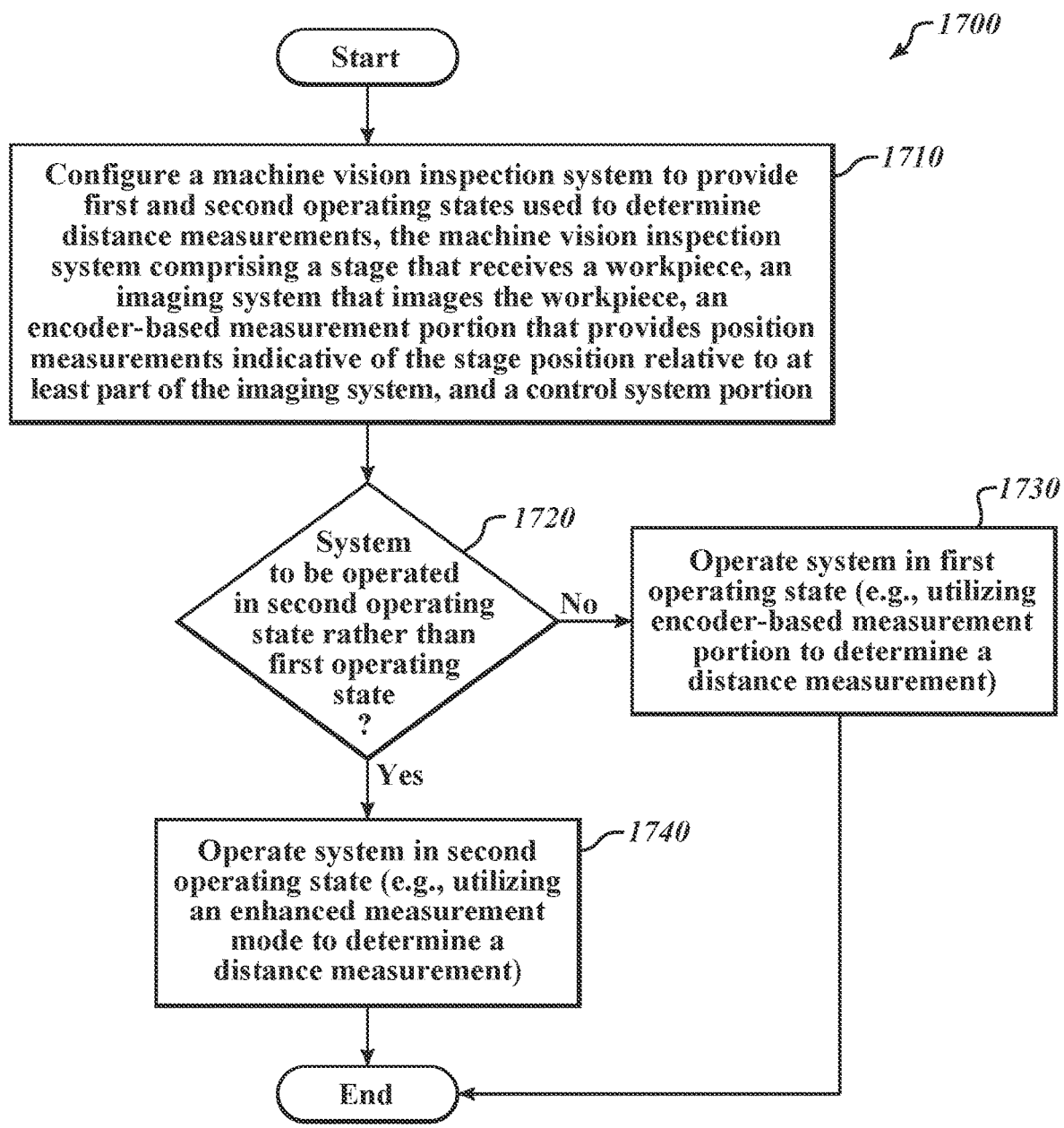
FIG. 17 is a flow diagram illustrating one embodiment of a general routine for operating a machine vision inspection system either in a first operating state (e.g., utilizing an encoder-based measurement portion) or a second operating state (e.g., utilizing an enhanced measurement mode) to determine a distance measurement.

FIG. 17 is a flow diagram illustrating one embodiment of a general routine 1700 for operating a machine vision inspection system either in a first operating state (e.g., utilizing an encoder-based measurement portion) or a second operating state (e.g., utilizing an enhanced measurement mode) to determine a distance measurement.

The routine 1700 starts with step 1710 including configuring a machine vision inspection system 100 to provide first and second operating states used to determine distance measurements. The machine vision inspection system 100 comprising a stage 210 that receives a workpiece 20, an imaging system 34' that images the workpiece, an encoder-based measurement portion XYMP that provides position measurements indicative of the stage position relative to at least part of the imaging system 34', and a control system portion 120.

In step 1720, it is determined whether the machine vision inspection system 100 is to be operated in the second operating state rather than the first operating state.

If "No", the routine 1700 proceeds to step 1730, in which the machine vision inspection system 100 is operated in the first operating state (e.g., utilizing the encoder-based measurement portion XYMP to determine a distance measurement).

If "Yes" on the other hand, the routine 1700 proceeds to step 1740, in which the machine vision inspection system 100 is operated in the second operating state (e.g., utilizing an enhanced measurement mode to determine a distance measurement).

Figure 18:
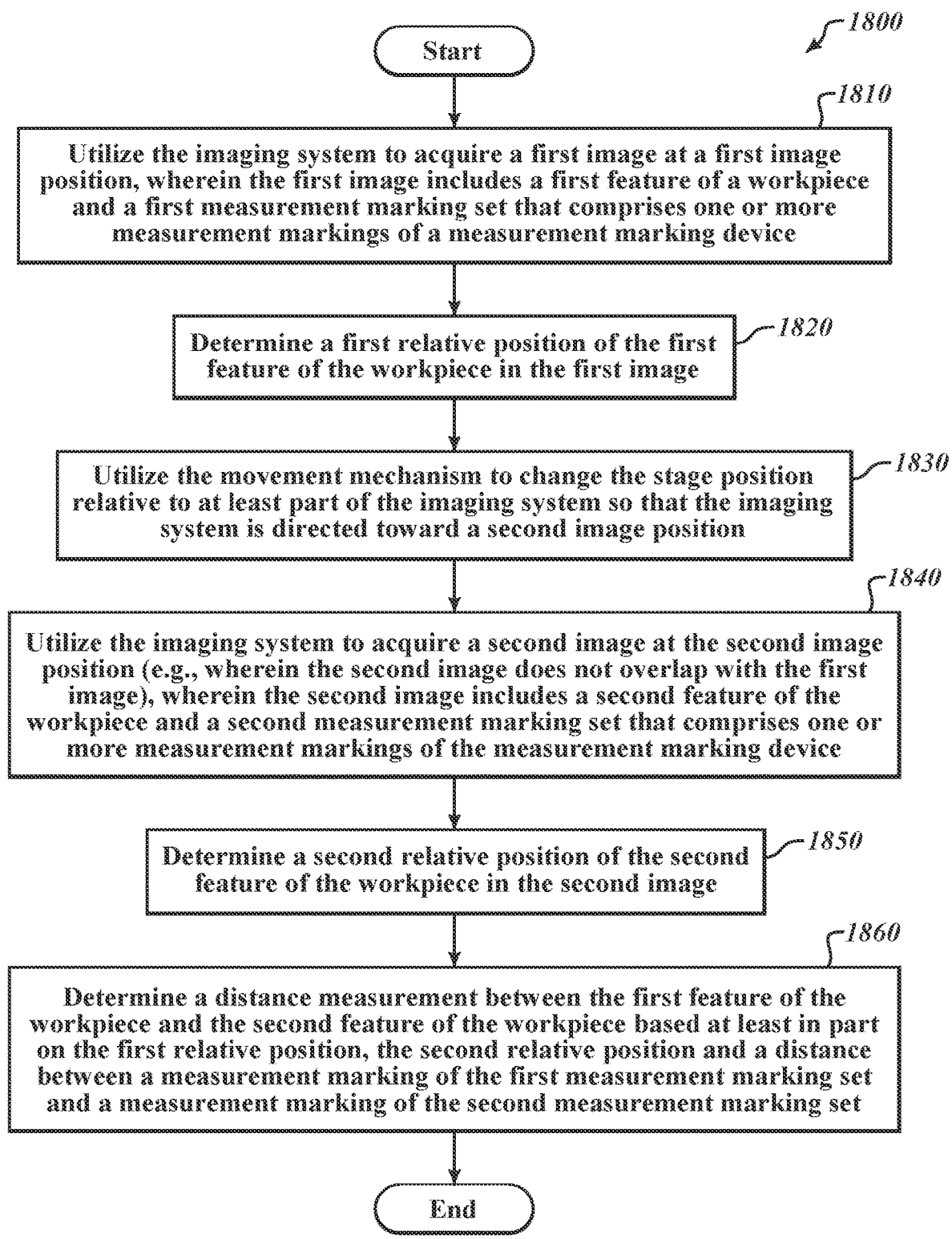
FIG. 18 is a flow diagram illustrating one embodiment of a routine for a more specific implementation of the second operating state of FIG. 17.

FIG. 18 is a flow diagram illustrating one embodiment of a routine 1800 for a more specific implementation of the second operating state of FIG. 17 (step 1740). In various implementations, the second operating state may alternatively be referenced as an enhanced measurement operating state (e.g., utilizing an enhanced measurement mode).

In step 1810, the imaging system 34' is utilized to acquire a first image IMG-1 at a first image position IP-1, wherein the first image IMG-1 includes a first feature FE-1 of a workpiece 20 and a first measurement marking set SET1MM that comprises one or more measurement markings MM of a measurement marking device MMD.

In step 1820, a first relative position of the first feature FE-1 of the workpiece 20 in the first image IMG-1 is determined.

In step 1830, a movement mechanism 294XY is utilized to change the stage position relative to at least part of the imaging system 34' so that the imaging system 34' is directed toward a second image position IP-2.

In step 1840, the imaging system 34' is utilized to acquire a second image IMG-2 at the second image position IP-2 (e.g., wherein the second image IMG-2 does not overlap with the first image IMG-1). The second image IMG-2 includes a second feature FE-2 of the workpiece 20 and a second measurement marking set SET2MM that comprises one or more measurement markings MM of the measurement marking device MMD.

In step 1850, a second relative position of the second feature FE-2 of the workpiece 20 in the second image IMG-2 is determined.

In step 1860, a distance measurement DFE12' between the first feature FE-1 of the workpiece and the second feature FE-2 of the workpiece is determined based at least in part on the first relative position, the second relative position and a distance between a measurement marking of the first measurement marking set SET1MM and a measurement marking of the second measurement marking set SET2MM.

In various implementations of the routines 1700 and 1800, the first relative position of the first feature FE-1 in the first image IMG-1 includes both a first relative position along a measuring axis direction MA of the measurement marking device MMD and a first relative position along a direction perpendicular to the measuring axis direction MA of the measurement marking device MMD in the first image IMG-1 (e.g., as described above in reference to FIGS. 15 and 16). Similarly, the second relative position of the second feature FE-2 in the second image IMG-2 may include both a second relative position along a measuring axis direction MA of the measurement marking device MMD and a second relative position along a direction perpendicular to the measuring axis direction MA of the measurement marking device MMD in the second image IMG-2.

Although the foregoing disclosure has generally described monochromatic images for clarity of description, edge detection and related processes such as those described above may be performed in an analogous manner in images comprising interspersed color pixels, for example an image comprising red, green and blue color channel pixels. As one example, the different color channel images may be treated as monochromatic images in a shared, overall, coordinate system. Each of the color channel images may be analyzed as previously described, and the resulting measurements from each of the channels may be combined by averaging, or other appropriate methods, in the overall coordinate system. In another example, the color channels may be combined according to known methods to provide a suitable "monochromatic" pseudo-image, which may be analyzed according to the foregoing methods.

While exemplary embodiments of the invention have been illustrated and described, numerous variations in the illustrated and described arrangements of features and sequences of operations will be apparent to one skilled in the art based on this disclosure. Also, the principles disclosed herein may be readily and desirably combined with various features disclosed in the incorporated references. These and other changes can be made to the implementations in light of the above-detailed description. In general, in the following claims, the terms used should not be construed to limit the claims to the specific implementations disclosed in the specification, but should be construed to include all possible implementations along with the full scope of equivalents to which such claims are entitled.

The invention claimed is:

1. A machine vision inspection system, comprising:
   a stage that receives a workpiece;
   an imaging system that images the workpiece;
   a movement mechanism configured to change a stage position relative to at least part of the imaging system;
   an encoder-based measurement portion that provides position measurements indicative of the stage position relative to at least part of the imaging system;
   a measurement marking device that is configured to be placed on the stage with the workpiece by a user, the measurement marking device comprising measurement markings that are configured to be imaged by the imaging system; and
   a control system portion, wherein:
      the machine vision inspection system is configured to provide first and second operating states, wherein,
         the first operating state comprises utilizing the encoder-based measurement portion to determine a distance measurement;
         the second operating state comprises:
            utilizing the imaging system to acquire a first image at a first image position, wherein the first image includes a first feature of a workpiece and a first measurement marking set that comprises one or more measurement markings on the measurement marking device that is located on the stage with the workpiece, wherein the first feature of the workpiece and the first measurement marking set of the measurement marking device are visible in the first image;
            determining a first relative position of the first feature of the workpiece in the first image;
            utilizing the movement mechanism to change the stage position relative to at least part of the imaging system so that the imaging system is directed toward a second image position;
            utilizing the imaging system to acquire a second image at the second image position, wherein the second image includes a second feature of the workpiece and a second measurement marking set that comprises one or more measurement markings on the measurement marking device that is located on the stage with the workpiece, wherein the second feature of the workpiece and the second measurement marking set of the measurement marking device are visible in the second image, and the first image and the second image do not overlap, for which the first image and the second image, and correspondingly the first measurement marking set that is included and visible in the first image and the second measurement marking set that is included and visible in the second image, do not include any measurement markings of the measurement marking device in common;
            determining a second relative position of the second feature of the workpiece in the second image; and
            determining a distance measurement between the first feature of the workpiece and the second feature of the workpiece based at least in part on the first relative position, the second relative position and a distance between a measurement marking of the first measurement marking set that is included and visible in the first image and a measurement marking of the second measurement marking set that is included and visible in the second image.

2. The machine vision inspection system of claim 1, wherein a distance between the first image position and the second image position is greater than a corresponding dimension of a field of view (FOV) of the imaging system at a current magnification.

3. The machine vision inspection system of claim 1, wherein a relative location of the measurement marking device in relation to the workpiece is determined at least in part in accordance with a location where the measurement marking device is placed by a user on the stage prior to the acquisition of the first image at the first image position.

4. The machine vision inspection system of claim 1, wherein the distance between a measurement marking of the first measurement marking set and a measurement marking of the second measurement marking set is determined based at least in part on at least one of:
   (a) image processing including image recognition of absolute markings associated with the measurement markings of the first and second measurement marking sets, for which the absolute markings indicate absolute position values along the measurement marking device; or
   (b) a distance measurement provided by the encoder-based measurement portion.

5. The machine vision inspection system of claim 4, wherein the distance between a measurement marking of the first measurement marking set and a measurement marking of the second measurement marking set is determined based at least in part on (a).

6. The machine vision inspection system of claim 4, wherein the distance between a measurement marking of the first measurement marking set and a measurement marking of the second measurement marking set is determined based at least in part on (b).

7. The machine vision inspection system of claim 1, wherein the first relative position is in relation to at least one of a measurement marking of the first measurement marking set or a reference location in the first image.

8. The machine vision inspection system of claim 1, wherein the first relative position of the first feature in the first image is determined based at least in part on an interpolated position of the first feature between two measurement markings of the first measurement marking set in the first image.

9. The machine vision inspection system of claim 8, wherein the interpolated position of the first feature of the workpiece is determined based at least in part on utilizing a contrast curve analysis to determine a location of the first feature of the workpiece and locations of the two measurement markings of the first measurement marking set in the first image.

10. The machine vision inspection system of claim 8, wherein one or more edge tools are utilized to determine the location of the first feature of the workpiece and the locations of the two measurement markings of the first measurement marking set in the first image.

11. The machine vision inspection system of claim 1, wherein one or more edge tools are utilized to determine a location of at least one measurement marking of the first measurement marking set in the first image and at least one measurement marking the second measurement marking set in the second image.

12. The machine vision inspection system of claim 1, wherein the first image comprises image data corresponding to the first feature as acquired when the imaging system is focused at a first feature focus height, and image data corresponding to the first measurement marking set as acquired when the imaging system is focused at a measurement marking focus height that is different than the first feature focus height.

13. The machine vision inspection system of claim 12, wherein the imaging system comprises a variable focal length lens that is utilized for acquiring the image data at the different focus heights.

14. The machine vision inspection system of claim 1, wherein the first relative position of the first feature in the first image includes both a first relative position along a horizontal direction and a first relative position along a vertical direction in the first image.

15. The machine vision inspection system of claim 1, wherein the first relative position of the first feature in the first image includes both a first relative position along a measuring axis direction of the measurement marking device and a first relative position along a direction perpendicular to the measuring axis direction of the measurement marking device in the first image.

16. The machine vision inspection system of claim 15, wherein the determining of the first relative position of the first feature in the first image includes:
   determining a first distance from the first feature to a first measurement marking of the first measurement marking set;
   determining a second distance from the first feature to a second measurement marking of the first measurement marking set;
   wherein the first distance and the second distance are utilized for determining both the first relative position along the measuring axis direction of the measurement marking device and the first relative position along the direction perpendicular to the measuring axis direction of the measurement marking device in the first image.

17. The machine vision inspection system of claim 1, wherein the first relative position and the second relative position are determined in terms of a coordinate system of the measurement marking device.

18. A method for operating a machine vision inspection system that includes a stage that receives a workpiece, an imaging system that images the workpiece, a movement mechanism configured to change a stage position relative to at least part of the imaging system, an encoder-based measurement portion that provides position measurements indicative of the stage position relative to at least part of the imaging system, a measurement marking device that is configured to be placed on the stage with the workpiece by a user and that comprises measurement markings that are configured to be imaged by the imaging system, and a control system portion, the method comprising:
   providing first and second operating states which are utilized for determining distance measurements, wherein,
      the first operating state comprises utilizing the encoder-based measurement portion to determine a distance measurement;
      the second operating state comprises:
         utilizing the imaging system to acquire a first image at a first image position, wherein the first image includes a first feature of a workpiece and a first measurement marking set that comprises one or more measurement markings on the measurement marking device that is located on the stage with the workpiece, wherein the first feature of the workpiece and the first measurement marking set of the measurement marking device are visible in the first image;
         determining a first relative position of the first feature of the workpiece in the first image;
         utilizing the movement mechanism to change the stage position relative to at least part of the imaging system so that the imaging system is directed toward a second image position;
         utilizing the imaging system to acquire a second image at the second image position, wherein the second image includes a second feature of the workpiece and a second measurement marking set that comprises one or more measurement markings on the measurement marking device that is located on the stage with the workpiece, wherein the second feature of the workpiece and the second measurement marking set of the measurement marking device are visible in the second image, and the first image and the second image do not overlap, for which the first image and the second image, and correspondingly the first measurement marking set that is included and visible in the first image and the second measurement marking set that is included and visible in the second image, do not include any measurement markings of the measurement marking device in common;
         determining a second relative position of the second feature of the workpiece in the second image; and
         determining a distance measurement between the first feature of the workpiece and the second feature of the workpiece based at least in part on the first relative position, the second relative position and a distance between a measurement marking of the first measurement marking set that is included and visible in the first image and a measurement marking of the second measurement marking set that is included and visible in the second image.

19. A method for operating a machine vision inspection system in an enhanced measurement operating state, the machine vision inspection system comprising:
   a stage that receives a workpiece;
   an imaging system that images the workpiece;
   a movement mechanism configured to change a stage position relative to at least part of the imaging system;
   an encoder-based measurement portion that provides position measurements indicative of the stage position relative to at least part of the imaging system;
   a measurement marking device that is configured to be placed on the stage with the workpiece by a user, the measurement marking device comprising measurement markings that are configured to be imaged by the imaging system; and
   a control system portion,
   the method for operating the machine vision inspection system in the enhanced measurement operating state comprising:
      utilizing the imaging system to acquire a first image at a first image position, wherein the first image includes a first feature of a workpiece and a first measurement marking set that comprises one or more measurement markings on the measurement marking device that is located on the stage with the workpiece, wherein the first feature of the workpiece and the first measurement marking set of the measurement marking device are visible in the first image;

determining a first relative position of the first feature of the workpiece in the first image;

utilizing the imaging system to acquire a second image at a second image position, wherein the second image does not overlap with the first image and the second image includes a second feature of the workpiece and a second measurement marking set that comprises one or more measurement markings on the measurement marking device that is located on the stage with the workpiece, wherein the second feature of the workpiece and the second measurement marking set of the measurement marking device are visible in the second image, and the first image and the second image, and correspondingly the first measurement marking set that is included and visible in the first image and the second measurement marking set that is included and visible in the second image, do not include any measurement markings of the measurement marking device in common;

determining a second relative position of the second feature of the workpiece in the second image; and determining a distance measurement between the first feature of the workpiece and the second feature of the workpiece based at least in part on the first relative position, the second relative position and a distance between a measurement marking of the first measurement marking set that is included and visible in the first image and a measurement marking of the second measurement marking set that is included and visible in the second image.

20. The method of claim 19, wherein:

the first relative position of the first feature in the first image includes both a first relative position along a measuring axis direction of the measurement marking device and a first relative position along a direction perpendicular to the measuring axis direction of the measurement marking device in the first image; and the second relative position of the second feature in the second image includes both a second relative position along a measuring axis direction of the measurement marking device and a second relative position along a direction perpendicular to the measuring axis direction of the measurement marking device in the second image.

21. The machine vision inspection system of claim 1, wherein the measurement marking device is at least one of:

next to the workpiece;

at least partially underneath the workpiece; or at least partially on top of the workpiece.

22. The machine vision inspection system of claim 1, wherein the determining of the distance measurement between the first feature of the workpiece in the first image and the second feature of the workpiece in the second image is not based on any overlapping images between the first image and the second image.

* * * * *